US009704352B2

(12) United States Patent
Robbins et al.

(10) Patent No.: US 9,704,352 B2
(45) Date of Patent: Jul. 11, 2017

(54) INCORPORATING TRANSIENT SYMBOLS INTO WAGERING GAMES

(71) Applicant: WMS Gaming, Inc., Waukegan, IL (US)

(72) Inventors: Richard B. Robbins, Glenview, IL (US); Michael J. Irby, II, Chicago, IL (US); Jamie W. Vann, Chicago, IL (US); Thomas R. Wood, Alno (SE)

(73) Assignee: BALLY GAMING, INC., Las Vegas, NV (US)

( * ) Notice: Subject to any disclaimer, the term of this patent is extended or adjusted under 35 U.S.C. 154(b) by 466 days.

(21) Appl. No.: 14/274,033

(22) Filed: May 9, 2014

(65) Prior Publication Data

US 2014/0335933 A1 Nov. 13, 2014

Related U.S. Application Data

(60) Provisional application No. 61/821,509, filed on May 9, 2013.

(51) Int. Cl.

*A63F 13/00* (2014.01)
*G07F 17/34* (2006.01)
*G07F 17/32* (2006.01)

(52) U.S. Cl.

CPC .......... *G07F 17/34* (2013.01); *G07F 17/3267* (2013.01)

(58) Field of Classification Search

None
See application file for complete search history.

(56) References Cited

U.S. PATENT DOCUMENTS

| | | | |
|---|---|---|---|
| 4,837,728 | A | 6/1989 | Barrie et al. |
| 5,231,568 | A | 7/1993 | Cohen et al. |
| 5,373,440 | A | 12/1994 | Cohen et al. |
| 5,397,125 | A | 3/1995 | Adams |
| 5,564,700 | A | 10/1996 | Celona |
| 5,707,285 | A | 1/1998 | Place et al. |
| 5,941,772 | A | 8/1999 | Paige |
| 5,947,820 | A | 9/1999 | Morro et al. |
| 6,068,553 | A | 5/2000 | Parker |
| 6,113,098 | A | 9/2000 | Adams |
| 6,394,902 | B1 | 5/2002 | Glavich et al. |
| 6,523,824 | B1 | 2/2003 | Colapinto et al. |
| 6,540,609 | B1 | 4/2003 | Paige |
| 6,609,970 | B1 | 8/2003 | Luciano, Jr. |

(Continued)

*Primary Examiner* — Jason Yen
(74) *Attorney, Agent, or Firm* — DeLizio Law, PLLC

(57) ABSTRACT

A wagering game system and its operations are described herein. In some embodiments, the operations can include providing a wagering game for presentation, wherein the wagering game includes a first symbol set used to indicate one or more wagering game outcomes before initiation of a secondary contest. The operations can further include initiating the secondary contest, wherein the secondary contest is separate from the wagering game, and providing a second symbol set for use during the secondary contest, wherein the second symbol set is configured to indicate a promotional award for the secondary contest. The operations can further include incorporating the second symbol set into the wagering game. The operations can further include ending the secondary contest, and removing the second symbol set from the wagering game after the secondary contest ends.

28 Claims, 11 Drawing Sheets

(56) References Cited

U.S. PATENT DOCUMENTS

| | | | |
|---|---|---|---|
| 6,634,941 B2 | 10/2003 | Olive | |
| 6,648,761 B1 | 11/2003 | Izawa et al. | |
| 6,843,720 B2 | 1/2005 | Luciano et al. | |
| 6,875,107 B1 | 4/2005 | Luciano, Jr. | |
| 6,890,256 B2 | 5/2005 | Walker et al. | |
| 6,899,626 B1 | 5/2005 | Luciano et al. | |
| 7,008,320 B2 | 3/2006 | Rowe et al. | |
| 7,008,321 B2 | 3/2006 | Rowe et al. | |
| 7,025,674 B2 | 4/2006 | Adams et al. | |
| 7,320,641 B2 | 1/2008 | Luciano, Jr. | |
| 7,455,586 B2 | 11/2008 | Nguyen et al. | |
| 7,485,040 B2 | 2/2009 | Walker et al. | |
| 7,591,724 B2 | 9/2009 | Baerlocher | |
| 7,862,420 B2 | 1/2011 | Peterson et al. | |
| 7,997,972 B2 | 8/2011 | Nguyen et al. | |
| 8,209,221 B2 | 6/2012 | Schwartz et al. | |
| 8,439,743 B2 | 5/2013 | Schultz et al. | |
| 2002/0155880 A1* | 10/2002 | Glavich | G07F 17/3244 463/20 |
| 2003/0036427 A1 | 2/2003 | Brandstetter et al. | |
| 2003/0060256 A1 | 3/2003 | Joshi | |
| 2003/0064770 A1* | 4/2003 | Kaminkow | G07F 17/32 463/16 |
| 2004/0192429 A1 | 9/2004 | Moody | |
| 2006/0073876 A1* | 4/2006 | Cuddy | G07F 17/3244 463/20 |
| 2006/0194631 A1 | 8/2006 | Rowe et al. | |
| 2006/0205480 A1 | 9/2006 | Glavich et al. | |
| 2008/0139306 A1* | 6/2008 | Lutnick | G06Q 30/02 463/30 |
| 2008/0220851 A1 | 9/2008 | Glavich et al. | |
| 2009/0042634 A1 | 2/2009 | Cannon et al. | |
| 2009/0286592 A1* | 11/2009 | Vann | G07F 17/3267 463/20 |
| 2009/0325667 A1* | 12/2009 | Weber | G07F 17/3267 463/20 |
| 2010/0029364 A1 | 2/2010 | Zielinski | |
| 2010/0124969 A1* | 5/2010 | Hughes | G07F 17/3265 463/20 |
| 2011/0045908 A1* | 2/2011 | Ehrlich | G07F 17/32 463/42 |
| 2012/0077566 A1 | 3/2012 | Schultz et al. | |
| 2013/0065665 A1* | 3/2013 | Watkins | G07F 17/32 463/20 |
| 2013/0184055 A1 | 7/2013 | Schultz et al. | |
| 2013/0210530 A1* | 8/2013 | Nguyen | A63F 13/12 463/42 |

* cited by examiner

INCORPORATING TRANSIENT SYMBOLS INTO WAGERING GAMES

RELATED APPLICATIONS

This application claims the priority benefit of U.S. Provisional Application No. 61/821,509 filed May 9, 2013.

LIMITED COPYRIGHT WAIVER

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2014, WMS Gaming, Inc.

TECHNICAL FIELD

Embodiments of the inventive subject matter relate generally to wagering game systems and networks that, more particularly, present symbols in wagering games.

BACKGROUND

Wagering game machines, such as slot machines, video poker machines and the like, have been a cornerstone of the gaming industry for several years. Generally, the popularity of such machines depends on the likelihood (or perceived likelihood) of winning money at the machine and the intrinsic entertainment value of the machine relative to other available gaming options. Where the available gaming options include a number of competing wagering game machines and the expectation of winning at each machine is roughly the same (or believed to be the same), players are likely to be attracted to the most entertaining and exciting machines. Shrewd operators consequently strive to employ the most entertaining and exciting machines, features, and enhancements available because such machines attract frequent play and hence increase profitability to the operator. Therefore, there is a continuing need for wagering game machine manufacturers to continuously develop new games and gaming enhancements that will attract frequent play.

Many wagering games utilize symbols to present game play, outcomes, and the like. For example, slot games present symbols on slot reels. A player makes a wager and initiates a spin operation of the slot reels. The slot reels appear to spin independently during the spinning operations and, eventually, stop in specific reel-stop positions. The wagering game can generate a random number, in response to the initiation of the spin operation. Based on the random number, the wagering game selects specific reel-stop position for each of the reels. When the reels stop, their specific reel-stop positions will cause the symbols on the reels to be arranged in specific symbol configurations, which are presented on at least a portion of the slot reels visible to the player. Some of the specific symbol configurations appear in one or more paylines. The paylines are specific groupings of some of the symbols that appear on the reels, which groupings are eligible for a particular payout in the wagering game. If a symbol configuration that appears in one or more paylines matches a particular configuration indicated in a pay table, then the symbol configuration represents a winning outcome for the wagering game. The reward for the winning outcome is based on odds indicated in the pay table for the symbol configuration, an amount wagered in the wagering game, or other factors. The symbols of a wagering game, therefore, are critical to presentation of wagering game play and outcomes. Furthermore, the characteristics of the symbols, such as the imagery, animations, etc., are visibly prominent to the player and, thus, are important visual elements of wagering games that add to the excitement and fun of wagering games.

BRIEF DESCRIPTION OF THE DRAWING(S)

Embodiments are illustrated in the Figures of the accompanying drawings in which.

DESCRIPTION OF ILLUSTRATIVE EMBODIMENTS

Figure 1:
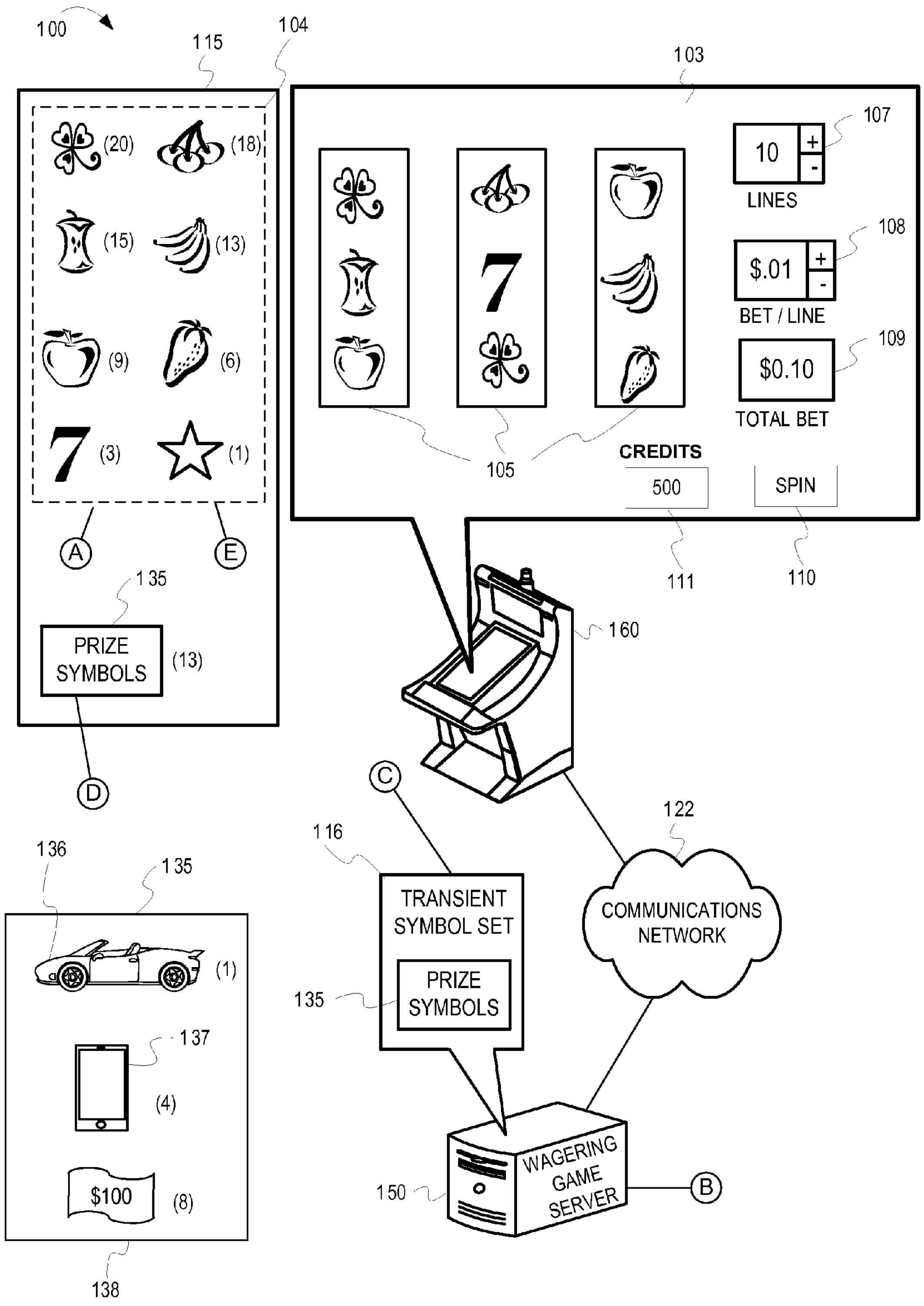
FIG. 1 is an illustration of incorporating transient symbols into a wagering game, according to some embodiments.

This description of the embodiments is divided into five sections. The first section provides an introduction to embodiments. The second section describes example operations performed by some embodiments while the third section describes additional example embodiments. The fourth section describes example operating environments while the fifth section presents some general comments.

Introduction

This section provides an introduction to some embodiments.

As specified previously, symbols are visibly prominent to a wagering game player ("player") and, thus, are an important visual elements of wagering games that add to the excitement and fun of wagering games. Furthermore, in a gaming venue, secondary contests, such as casino sponsored promotions, social or group activities related to gaming, and so forth, add to the fun and excitement of the gaming experience. Some embodiments of the inventive subject matter are directed to using, temporarily, a set of symbols ("transient symbol set") for the wagering game (e.g., a slot game, a card game, etc.) for a limited duration of a secondary contest. In some embodiments, a set of custom symbols ("transient symbols") from the transient symbol set are incorporated into a default symbol set for the wagering game. In some embodiments, a portion of symbols from the wagering game are appropriated, and changed in value ("transient value"), for use with the secondary contest. For the limited duration of the secondary contest, the transient symbol set is used to indicate awarding of one or more prizes for the secondary contest. In some embodiments, the prizes can be monetary or non-monetary and can include prizes not available via the wagering game, such as cash prizes, event tickets, merchandise, goods, services, customer loyalty points, invitations, content, coupons, accommodations, complimentary items, status enhancers, privileges, downloads, etc. In some instances, the prizes are not funded by wagers from the wagering game, and are instead funded by marketing funds. In some instances, the prizes for the secondary contest may be referred to as "secondary prizes," "promotional prizes," or "promotional awards" indicating that the prizes for the secondary contest are different from prizes or awards that are offered via the wagering game. The prizes can vary from one occurrence of a secondary contest to another occurrence of the secondary contest. In some embodiments, the transient symbols include indicia (e.g., images, symbols, descriptions, etc.) of the prizes that are available in the secondary contest. When the secondary contest ends (i.e., the limited duration terminates), the transient symbol set is no longer available (e.g., custom symbols are removed from a default set of symbols for the wagering game and/or appropriated symbols return to an original value after the secondary game contest ends). Some embodiments further include modifying rules (e.g. math rules, game rules, symbol presentation rules, etc.) of the wagering game to automatically change, or update, based on values associated with parameters for the secondary contests (e.g., based on a value of one or more prizes of the secondary contest).

FIG. 1 is a conceptual diagram that illustrates an example of incorporating transient symbols into a wagering game, according to some embodiments. In FIG. 1 a wagering game system ("system") 100 includes a wagering game machine 160 configured to present wagering game content 103. In some embodiments, the system 100 includes additional devices, such as a wagering game server 150 connected to the wagering game machine 160 via a communications network 122. In one example, the wagering game machine 160 stores and processes the wagering game content 103, receives wagering game content 103 from and communicates data with the wagering game server 150, communicates with peripheral devices, integrates with environmental devices, etc. The wagering game machine 160 presents the wagering game content 103 for a wagering game. The wagering game content 103 depicted in FIG. 1 is for a slot game in which a player can make wagers on a random outcome of the slot game. For example, a player can wager on a random presentation of slot symbols 104 that appear to spin on slot reels 105. The wagering game provides an activation control (e.g., a "spin" button 110) which a player can use to initiate a computerized operation that causes the reels 105 to appear to spin. The wagering game also provides wagering controls that a player can use to set a betting level (e.g., an amount to bet for each spin of the slot reels 105). For example, the wagering game provides a bet control 108 and a line control 107. The bet control 108 sets a specific bet value (e.g., in credits, dollars, pounds, virtual currency, points, etc.). The line control 107 specifies a number of pay lines, or ways that the symbols 104 can appear grouped in potentially winning configurations. A total bet meter 109 specifies the total bet amount that the player will spend for each spin (e.g., the total bet amount equals the value specified in the bet control 108 times the value specified in the line control 107). A meter 111 specifies a number of units of value (e.g., credits, dollars, pounds, virtual currency, points, etc.) that the player possesses for use in the wagering game to make wagers.

At a first stage, "A," prior to the beginning of a secondary contest, the system 100 uses a first symbol set 115 to present (e.g., via the wagering game machine 160) outcomes for the wagering game. For instance, the first symbol set 115 includes all symbols that can potentially appear during the wagering game to indicate symbol configurations. In some embodiments, the system 100 is configured to maintain a consistent number and order of the symbols 104 on any of the reels 105. For instance, based on a pay table for the wagering game, certain odds are associated with occurrence of certain ones of the symbols 104. Therefore, any one of the reels 105 has more of some of the symbols 104 and less of others of the symbols 104. The first symbol set 115, for example, indicates that of all the symbols 104 associated with any given one of the reels 105, there are twenty symbols that look like shamrocks, eighteen that look like cherries, fifteen that look like apple cores, thirteen that look like bananas, nine that look like apples, six that look like strawberries, three that look like the "lucky 7" and one that looks like a star. The differing numbers of the separate ones of the symbols 104 are proportional to a degree of the odds for each of the symbols 104 according to the pay table for the wagering game (e.g., the wagering game has the highest odds of presenting one or more of shamrock symbols and the least odds of presenting one or more of the star symbols).

At a second stage, "B," the wagering game server 150 initiates the secondary contest in which one or more prizes are offered, in addition to potential rewards associated with the wagering game. The secondary contest only has a limited duration, such as a time period (e.g., a four-hour period starting at 8 PM and ending at 12 AM). The secondary contest will run during that time period, during which a player at the wagering game machine 160 (and/or other players at other wagering game machines not shown which are also connected to the wagering game server 150 via the communications network 122) can potentially win the one or more prizes for the secondary contest. The secondary contest is referred to as "secondary" because it is not the primary game feature offered via the wagering game machine 160. The wagering game is the primary game feature and, therefore, may be referred to as the "primary" content or "primary wagering game" to distinguish is from the secondary contest and/or other secondary features ancillary to the primary content.

At a third stage, "C," the system provides (e.g., via the wagering game server 150) a second set of symbols 116 to use in the wagering game to indicate that the one or more prizes are won for the secondary contest. For example, the wagering game server 150 provides one or more symbols (e.g., symbols 135) to include in the first symbol set 115. The second set of symbols 116 is used only temporarily for the duration of the secondary contest. Therefore, the second set of symbol 116 may also be referred to as a "transient symbol set" and the symbols of the transient symbol set 116 (e.g., symbols 135) may be referred to as a "transient symbols."

The symbols 104 in the first set, prior to initiation of the secondary contest, may be referred to as "default" symbols or "primary" symbols.

At a fourth stage, "D," the system 100 incorporates the transient symbols (e.g., the symbols 135) from the transient symbol set 116 into the first symbol set 115 for use in the wagering game. The system 100 can designate a number of instances of the symbols 135 to be included into the first symbol set 115 based on a desired odds of occurrence for any of the symbols 135 during the wagering game. For example, the system 100 offers at least three prizes in the secondary contest: a car, a two smartphones, and five $100 cash prizes. A first of the symbols 135 (i.e., symbol 136) is used to indicate an award of the car. A second of the symbols 135 (i.e., symbol 137) is used to indicate an award of a smartphone. A third of the symbols 135 (i.e., the symbol 138) is used to indicate an award of a $100 cash prize. The car is the most valuable of all of the prizes, so only one car is offered. The smartphone is the next most valuable of the prizes so more than one is offered, but only a few. The $100 prize is the least valuable of the prizes, so more of those prizes are offered. Based on various factors, such as (a) the value of the prizes, (b) a number of each of the prizes to be awarded in the secondary contest, and (c) game rules for the secondary contest (e.g., a number of required instances of the symbols 135 to indicate an award), the system determines a number of instances of the symbols 136, 137, and 138 to include in the first symbol set 115. For instance, the system 100 determines that one instance of the symbol 136, four instances of the symbol 137, and eight instances of the symbol 138, is to be assigned to each of the reels 105. In other examples, the system 100 may assign more instances of the symbols 135 to some of the reels 105 and fewer instances of the symbols 135 to others of the reels 105. The system 100 then incorporates the symbols 135 into the first symbol set 115. After incorporating the symbols 135 into the first symbol set 115, the system 100 can adjust rules for the wagering game (e.g., math rules, game play rules, symbol presentation rules, etc.) to compensate for the inclusion of the symbols 135 into the first symbol set 115 and/or for an amount of prizes that may be paid out for the secondary contest via the wagering game. More details can be found below, for example, in the description associated with FIGS. 3-8.

At a fourth stage, "E," the system 100 terminates, or ends, the secondary contest and restores the first symbol set 115 to its original members (e.g., removes the symbols 135 from the first symbol set 115 leaving only the default symbols 104). The system 100 further restores default rules for the wagering game based on the removal of the symbols 135.

Although FIG. 1 describes some embodiments, the following sections describe many other features and embodiments.

Some embodiments of the inventive subject matter describe examples of incorporating transient symbols into wagering games in a network wagering venue (e.g., an online casino, a wagering game website, a wagering network, etc.) using a communication network, such as the communications network 122 in FIG. 1. Embodiments can be presented over any type of communications network that provides access to wagering games, such as a public network (e.g., a public wide-area-network, such as the Internet), a private network (e.g., a private local-area-network gaming network), a file sharing network, a social network, etc., or any combination of networks. Multiple users can be connected to the networks via computing devices. The multiple users can have accounts that subscribe to specific services, such as account-based wagering systems (e.g., account-based wagering game websites, account-based casino networks, etc.).

Further, for purposes of the present detailed description, a user may be referred to as a player (i.e., of wagering games), and a player may be referred to interchangeably as a player account. Account-based wagering systems utilize player accounts when transacting and performing activities, at the computer level, that are initiated by players. Therefore, a "player account" represents the player at a computerized level. The player account can perform actions via computerized instructions. For example, in some embodiments, a player account may be referred to as performing an action, controlling an item, communicating information, etc. Although a player, or person, may be activating a game control or device to perform the action, control the item, communicate the information, etc., the player account, at the computer level, can be associated with the player, and therefore any actions associated with the player can also be associated with the player account. Therefore, for brevity, to avoid having to describe the interconnection between player and player account in every instance, a "player account" may be referred to herein in either context. Further, in some embodiments herein, the word "gaming" is used interchangeably with "gambling."

Furthermore, for purposes of the present detailed description, the terms "wagering games," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game may involve wagers of real money, as found with typical land-based or on-line casino games. In other embodiments, the wagering game may additionally, or alternatively, involve wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Example Operations

This section describes operations associated with some embodiments. In the discussion below, some flow diagrams are described with reference to block diagrams presented herein. However, in some embodiments, the operations can be performed by logic not described in the block diagrams.

In certain embodiments, the operations can be performed by executing instructions residing on machine-readable storage media (e.g., software), while in other embodiments, the operations can be performed by hardware and/or other logic (e.g., firmware). In some embodiments, the operations can be performed in series, while in other embodiments, one or more of the operations can be performed in parallel. Moreover, some embodiments can perform more or less than all the operations shown in any flow diagram.

Figure 2:
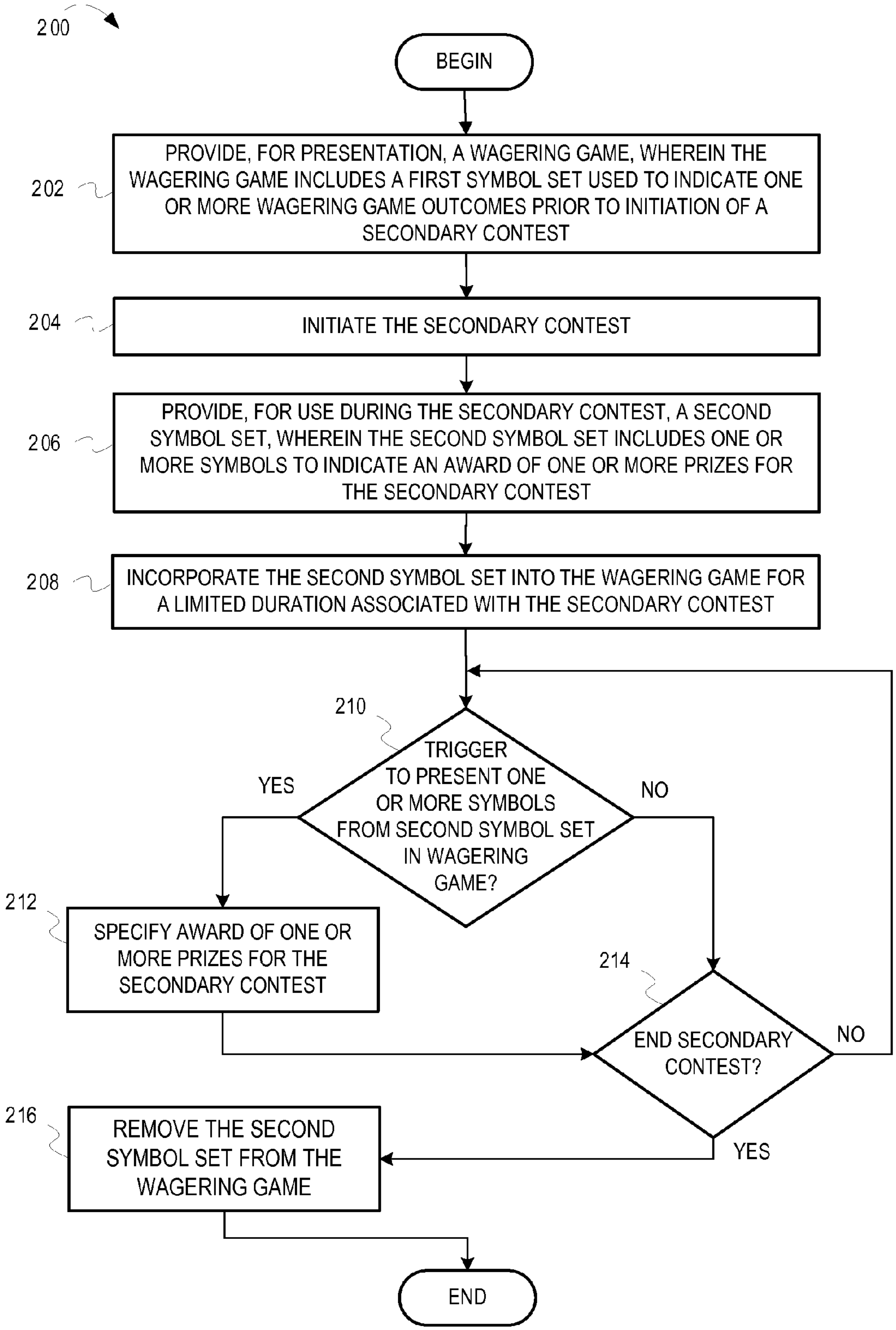
FIG. 2 is a flow diagram 200 illustrating incorporating transient symbols into a wagering game, according to some embodiments.
Figure 3:
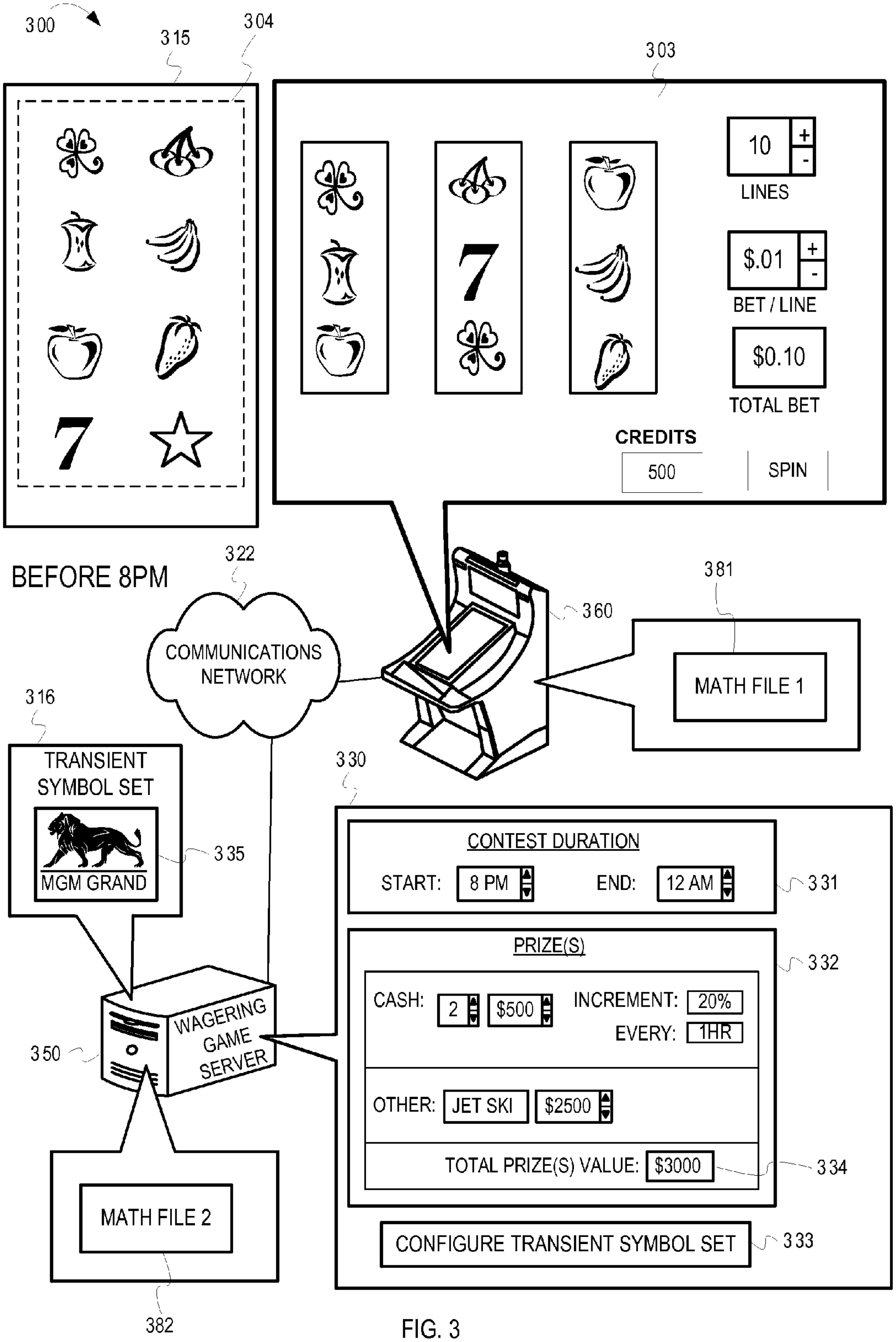
FIG. 3 is an illustration of setting parameters for a temporary secondary contest, according to some embodiments.
Figure 4:
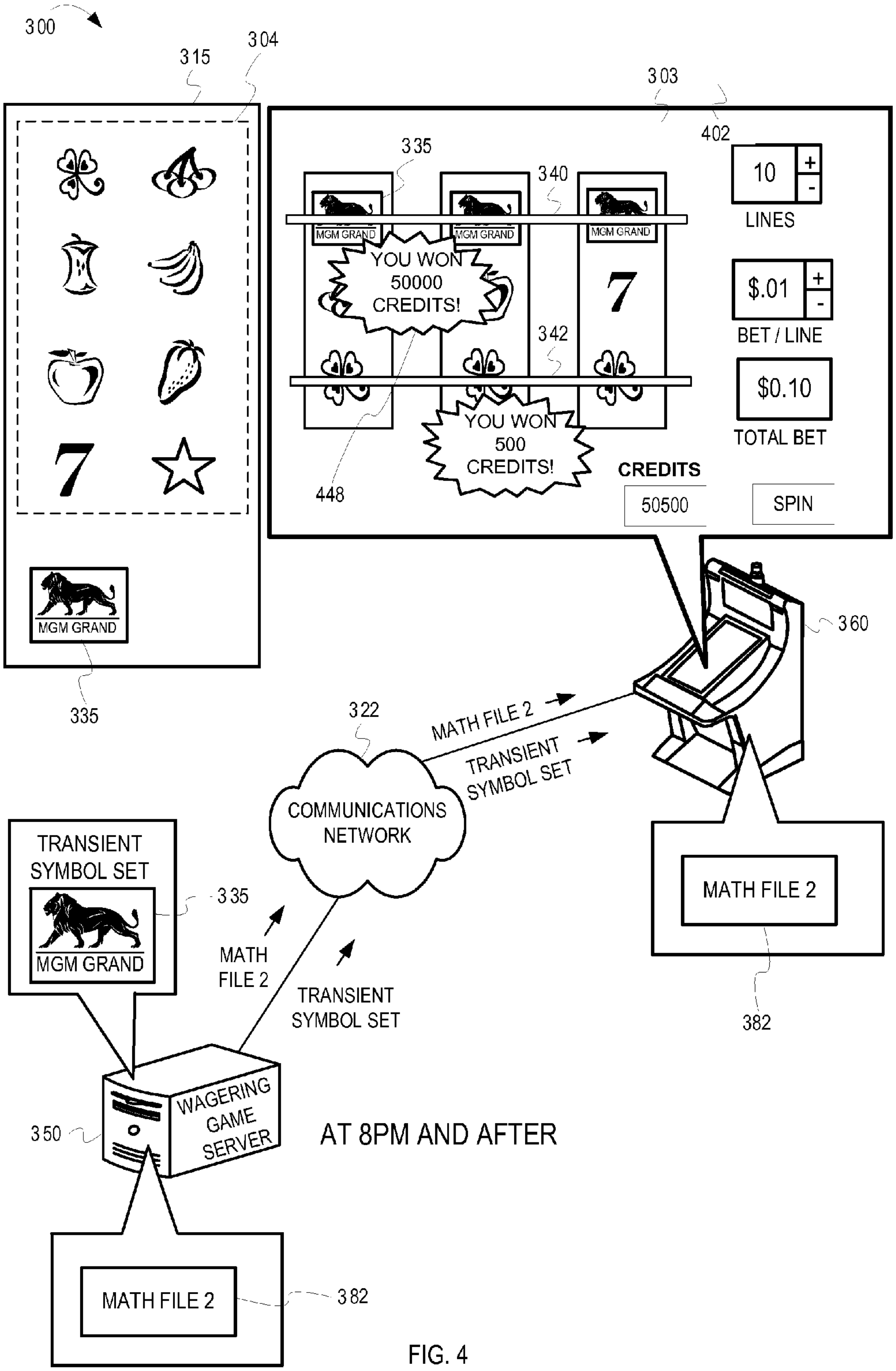
FIG. 4 is an illustration of providing temporary math rules and transient symbol sets for a wagering game, according to some embodiments.
Figure 5:
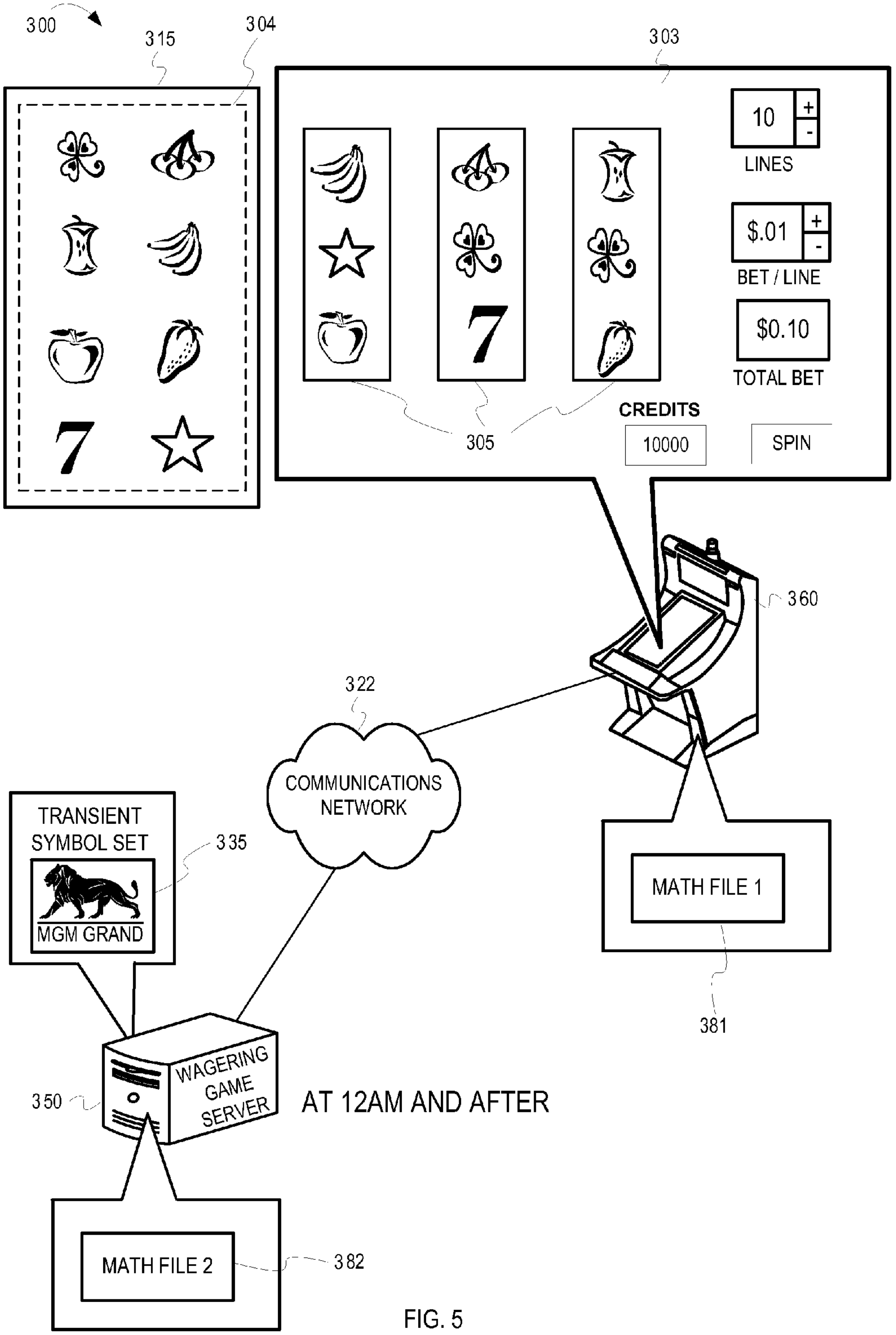
FIG. 5 is an illustration of restoring the temporary math rules and transient symbol sets after an end of a temporary secondary contest, according to some embodiments.

FIG. 2 is a flow diagram ("flow") 200 illustrating incorporating transient symbols into a wagering game, according to some embodiments. FIGS. 3, 4, and 5 are conceptual diagrams that help illustrate the flow of FIG. 2, according to some embodiments. This description will present FIG. 2 in concert with FIGS. 3, 4, and 5. In FIG. 2, the flow 200 begins at processing block 202, where a wagering game system ("system") provides, for presentation, a wagering game, wherein the wagering game includes a first symbol set used to indicate one or more wagering game outcomes prior to initiation of a secondary contest. An example of a first symbol set is described in FIG. 1 (e.g., symbol set 115). FIG. 3 illustrates another example of a system 300 similar to the system 100. In FIG. 3, the system 300 includes a wagering game machine 360 connected to a wagering game server 350 via a communications network 322. The system 300 uses a first symbol set 315 for a wagering game associated with wagering game content 303.

The flow 200 continues at processing block 204, where the system initiates the secondary contest. In some embodiments, prior to initiation of the secondary contest, the system presents a configuration tool to configure parameters of the secondary contest. In FIG. 3, for example, the system 300 provides a configuration tool 330 with options to enter secondary contest parameters, such as one or more options 331 to enter one or more time periods for the secondary contest, one or more options 332 to specify one or more prizes to be awarded as well as prize values for the one or more prizes, and one or more options 333 to specify the transient symbols for one or more transient symbol sets (e.g., transient symbol set 316).

The configuration tool 330 can specify parameters that change automatically, incrementally, sequentially, or in other ways. For instance, the configuration tool 330 can include options to indicate that a first transient symbol set, or a first portion of the transient symbol set 316, is used for a given time period (e.g., 8 PM-10 PM) and a second transient symbol set, or a second portion of the transient symbol set 316, is used for a sequential time period (e.g., from 10 PM-12 AM). In another example, the configuration tool 330 can include options to specify that a prize value can increase throughout the secondary contest period (e.g., a first prize is offered during a first period while a second prize is offered for a second period, or a value of the prize increases automatically when the second time period begins).

In some examples, the configuration tool 330 includes options to specify limits to prize values to prevent an expected payout to exceed certain thresholds.

In some examples, the configuration tool 330 includes options to describe the one or more prizes. The configuration tool 330 can be used to specify media of the prize(s) (e.g., a picture of the prize, a video of the prize, etc.). In some examples, the configuration tool 330 can provide options to upload art images, videos, or other files for use as the transient symbol set 316 (e.g., a custom image of transient symbol(s) 335). The configuration tool 330 can automatically resize media to appropriate sizes and resolutions (e.g., appropriate sizes to fit on slot reels). In some instances, the symbols 335 have indicia that indicates (e.g., has an appearance of, describes, etc.) the prizes to be awarded, such as the symbols 135 shown in FIG. 1. In other instances, the symbols 335 have a generic appearance, and a prize is awarded based on a number of the symbols 335 that are presented (e.g., three of the symbols 335 in a payline wins a first prize, from the secondary-contest prizes, whereas six of the symbols 335 in two paylines wins a second prize worth more than the first prize). In some instances, the symbols 335 morph into an appearance of the prizes that are awarded. In some instances, the system 300 indicates awards in other ways than via indicia on the symbols 335, such as via messages, congratulatory effects, sounds, etc.

In some examples, the configuration tool 330 includes an option to present the media and/or descriptions of the prize(s), transient symbols (e.g., transient symbol(s) 335), etc. within an attract sequence for the wagering game machine 360, or in other promotional demonstrations, to promote a scheduled secondary contest.

The flow 200 continues at processing block 206, where the system provides, for use during the secondary contest, a second symbol set, wherein the second symbol set includes one or more symbols to indicate an award of one or more prizes for the secondary contest.

In FIG. 3, the configuration tool 330 is used to upload one or more custom symbols (e.g., the transient symbol(s) 335) for inclusion in the transient symbol set 316. The transient symbol(s) 335 can be one or more symbols (e.g., a single symbol, a row of symbols, a column of symbols, an array of symbols, etc.). In some examples, the transient symbol(s) 335 have an appearance different from any default symbols 304 in the first symbol set 315. In some examples, the transient symbol(s) 335 are unique to a sponsor of the secondary contest (e.g., the symbol(s) 335 have an appearance of a brand of a casino in which the secondary contest is held).

In some examples, the configuration tool 330 provides options to cause the transient symbol set 316 to increase in value for sequential time periods. For instance, if the secondary contest spans four hours in duration (e.g., from 8 PM-12 AM), during the first hour of the four hour duration, the system 300 uses a first portion of the transient symbol set 316 (e.g., each of a first portion of the transient symbol(s) 335 has a value of $50 during the first hour). For the second hour of the four-hour duration, the system 300 uses a second portion of the transient symbol set 316, different from the first portion. The symbols from the second portion of the transient symbol set 316 have a higher value than symbols from the first portion of the transient symbol set 316 (e.g., each of the second portion of the transient symbol(s) 335 have a value of $100 during the second hour). Subsequent portions of the transient symbol(s) 335 are used in the third and fourth hours, each with higher values (e.g., a third portion of the transient symbol(s) 335 is used in the third hour where each is worth $150; a fourth portion of the transient symbol(s) 335 is used in the fourth hour where each is worth $200).

In some examples, the value of the transient symbol(s) 335 can increase or decrease during the time period(s) of the secondary contest based on player actions, game conditions, etc. For example, if a player increases their average wager in the wagering game during the secondary contest, or if the player accomplishes certain game goals in the wagering game during the secondary contest, the system 300 can proportionately increase the value of the transient symbol(s) 335.

The flow 200 continues at processing block 208, where the system incorporates the second symbol set into the wagering game for a limited duration associated with the secondary contest.

For example, referring to FIG. 4, when the secondary contest begins (e.g., the system 400 detects that a system clock reads "8 PM") the transient symbol(s) 335 are added to the first symbol set 315 without replacing any of the default symbols 304 in the first symbol set 315. In other instances, the transient symbol(s) 335 replace some, or all, of the default symbols 304 in the first symbol set 315. In some embodiments, the wagering game server 350 provides the transient symbol(s) 335 to the wagering game machine 360 to use as part of the first symbol set 315.

In some examples, the transient symbol(s) 335 become instantly eligible for use at the beginning of the secondary contest (i.e., are included in the first symbol set 315 at a beginning time (e.g., 8 PM) for the secondary contest for potential appearance as part of the wagering game) and instantly become ineligible for use at the expiration of the secondary contest (e.g., are removed from the first symbol set 315 at an end time for the secondary contest (e.g., at 12 AM)).

The flow 200 continues at processing block 210, where the system determines whether a trigger occurs to present one or more symbols from the second symbol set in the wagering game. For instance, in response to initiation of a spin operation, the wagering game can generate, or receive, a random number that causes a reel-stop configuration of reels 305, which presents a portion of the default symbols 104 and one or more of the transient symbol(s) 335. The one or more of the transient symbol(s) 335 presented via the reels 305 align in a winning configuration in an eligible payline 340. Concurrently, one or more of the default symbols 304 align in a winning configuration in an additional eligible payline 342.

Returning momentarily to the description of FIG. 2, if a trigger occurs to present the one or more symbols from the second symbol set, the flow 200 continues at processing block 212, where the system specifies an awarding of one or more prizes for the secondary contest. The system can award a prize, or prizes, when certain symbols, or configurations of symbols, appear in the wagering game from the transient symbol set (e.g., in FIG. 4, the system 300 presents a congratulatory message 448 when three of the transient symbol(s) 335 align in the payline 340). In some embodiments, the transient symbol(s) can indicate the particular prize. The prizes can have monetary value, such as products, services, money, etc. In other examples, the prizes offer additional game content, virtual trophies, points, privileges, invitations to events, or other non-monetary awards. In some embodiments, the prize(s) can be funded by the wagering game. In some embodiments, the prize(s) can be funded by sponsors, marketing money, or sources of funds other than from the wagering game. The system can offer varying prize sizes, such as prize amounts based on what a casino operator wants to offer and/or prize amounts that increase during a secondary contest. The system can provide the prizes for the secondary contest in addition to prizes or awards already offered in the wagering game. In some examples, the system awards from a pool of prizes. The system can present an inventory of available prizes. When one player wins one prize, that prize is removed from the inventory of available prizes.

The flow 200 continues at processing block 214, where the system determines whether to end the secondary contest. For example, in FIG. 5, the wagering game server 350 detects that a system clock reads 12 AM, which was indicated previously as being the end time for the secondary contest. If, at processing block 214, the system determines to end the secondary contest, the flow 200 continues at processing block 216, where the system removes the second symbol set from the wagering game. When the system determines to end the secondary contest, the system returns the wagering game to a default condition. For example, in FIG. 5, the system 300 removes the transient symbol(s) 335 from the first symbol set 315. Thereafter, the wagering game continues to use the default symbols 304 from the first symbol set 315, but not the transient symbol(s) 335.

Figure 6:
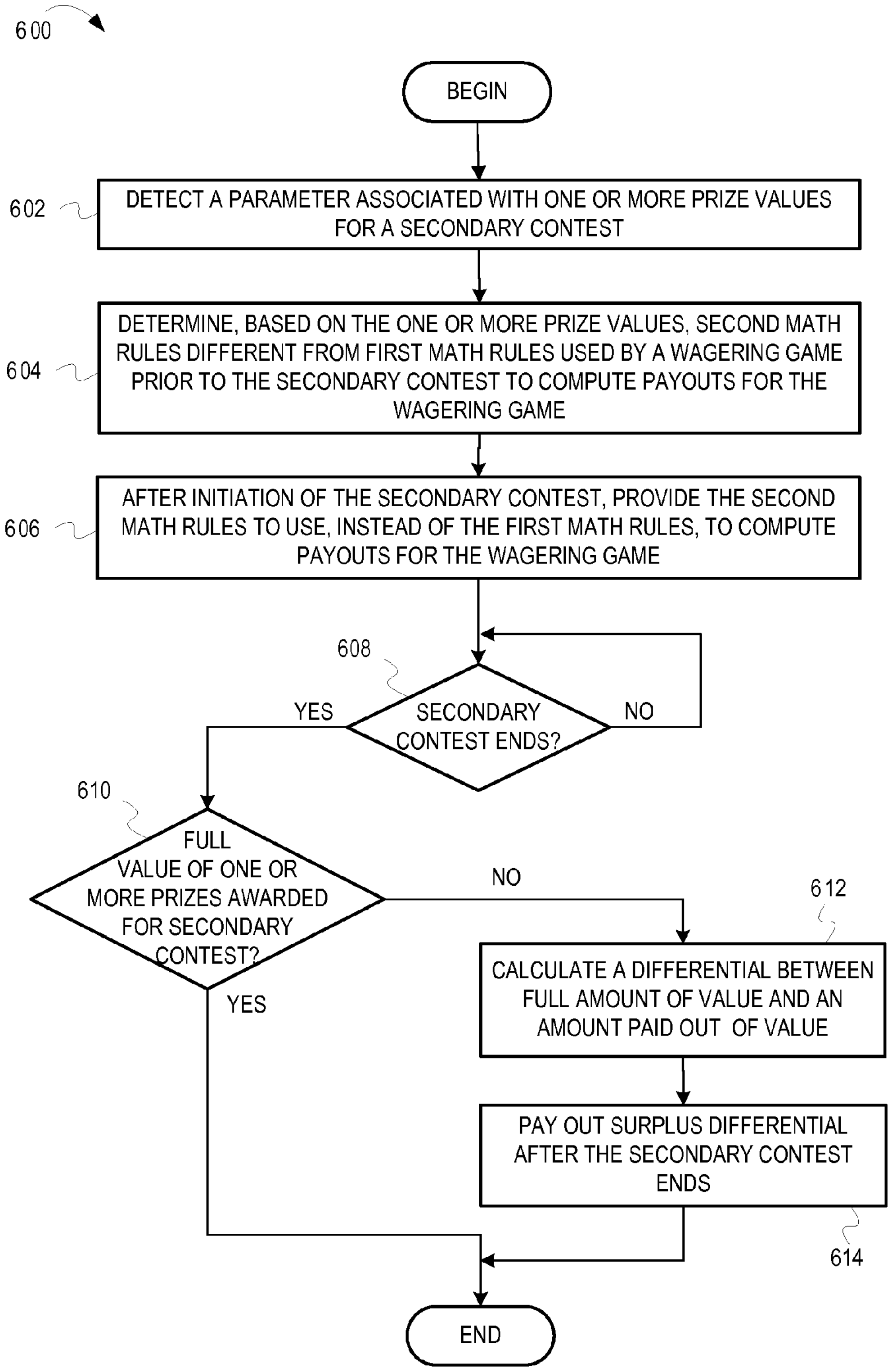
FIG. 6 is a flow diagram 600 illustrating adapting math rules of a wagering game to values associated with a temporary secondary contest, according to some embodiments.

FIG. 6 is a flow diagram ("flow") 600 illustrating adapting math rules of a wagering game to values associated with a temporary secondary contest, according to some embodiments. FIGS. 3, 4, 5, and 7 are conceptual diagrams that help illustrate the flow of FIG. 6, according to some embodiments. This description will present FIG. 6 in concert with FIGS. 3, 4, 5, and 7. In FIG. 6, the flow 600 begins at processing block 602, where a wagering game system ("system") detects a parameter associated with one or more prize values for a secondary contest. For example, in FIG. 3, the system 300 automatically detects a value 334 of all prizes offered for the secondary contest (e.g., the value 334 is a sum total of the two $500 cash prizes offered and a value for the jet ski specified as being worth $2500). In some embodiments, the system 300 is configured to provide options for an operator to input, or specify, all of the prize values, which add up to the value 334.

The flow 600 continues at processing block 604, where the system determines, based on the one or more prize values, second math rules different from first math rules, wherein the first math rules are used by the wagering game prior to the secondary contest to compute payouts for the wagering game. For example, in FIG. 3, based, at least on the value 334, the system 300 determines what the math rules for the wagering game should be to cause the wagering game to function properly, and adhere to certain jurisdictional payout guidelines or requirements, given the incorporation of the transient symbol(s) 335 and the offering of the prizes associated with the secondary contest. In some embodiments, the system 300 also determines the math rules based on other game conditions (e.g., a duration of the secondary contest, a number of the transient symbol(s) 335, values assigned to the transient symbol(s) 335, changes to the transient symbol(s) 3345 during the secondary contest, a wager denomination value in the wagering game, a wagering history by a player, etc.).

The wagering game is configured to use a first math file 381, with first math rules, to compute payouts for the wagering game prior to initiation of the secondary contest. The system 300 determines, based on the value 334 and/or other game conditions, that a second math file 382, with second math rules, should be used at the initiation of the secondary contest, and throughout the secondary contest, to compute payouts for the wagering game given the value 334. In some embodiments, the system 300 can utilize multiple math files throughout the duration of the secondary contest based on whether the value 334 increases, or decreases, during the secondary contest. In some embodiments, the system can automatically update the second math file 382 based on changes to parameters, a number or prizes awarded, etc. For example, if a time period for the secondary contest is coming close to an end, the system 300 can alter rules in the second math file 382 to increase odds of players winning the prizes for the secondary contest.

Figure 7:
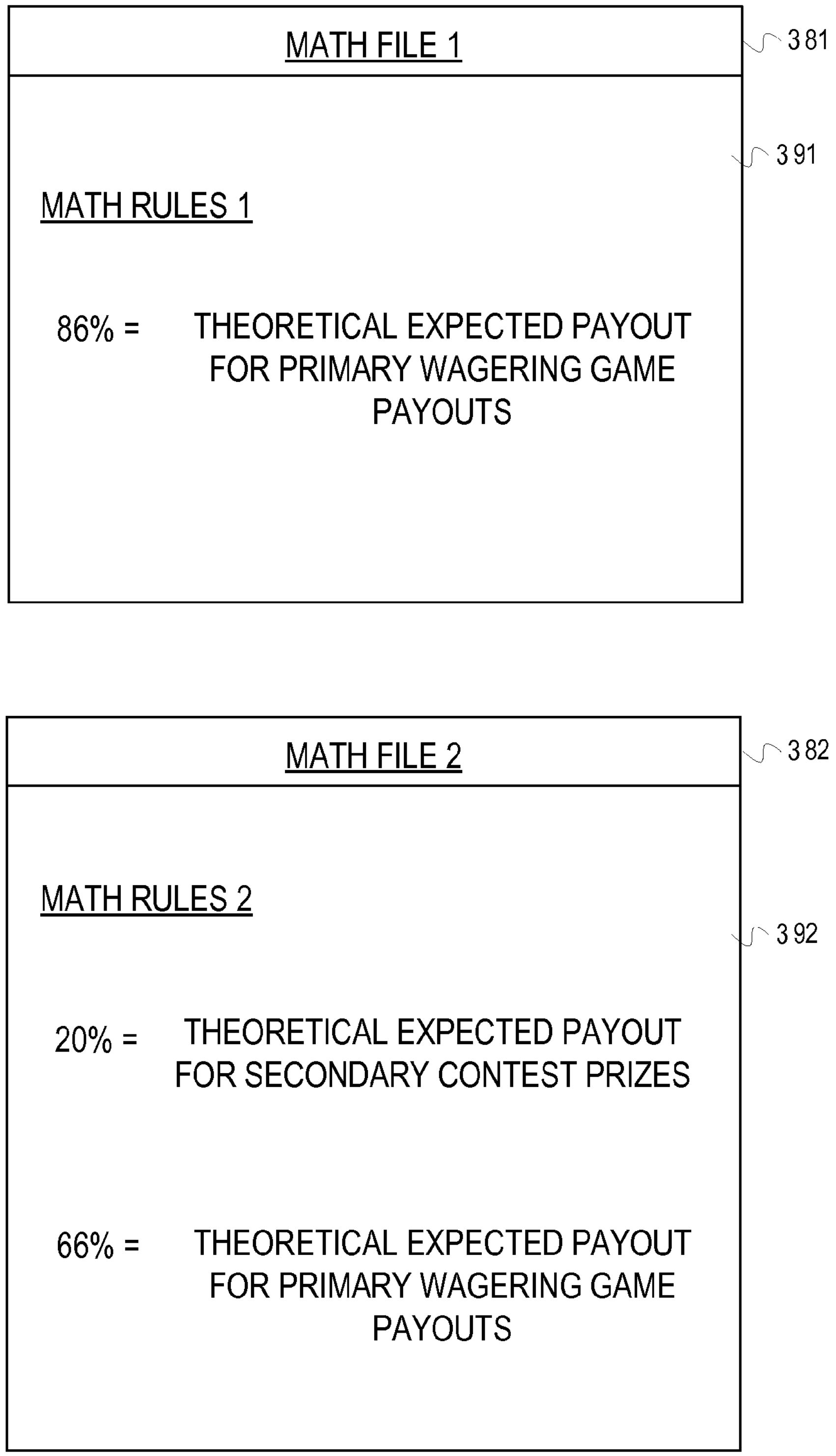
FIG. 7 is an illustration of differing math rules for a temporary secondary contest, according to some embodiments.

FIG. 7 illustrates some examples of first math rules 391 in the first math file 381 and second math rules 392 in the second math file 382. The first math rules 391 describe a theoretical expected payout for functions of the wagering game prior to the beginning of the secondary contest. For instance, the wagering game is expected to pay out, over time, 86% of wagers made in the wagering game via the wagering game machine 360. An extra payout of prizes for the secondary contest affects actual payouts for the wagering game made via the wagering game machine 360. Thus, the value 334 represents an expected payout of the secondary contest to be incorporated into the wagering game. Therefore, based on the value 334, the system 300 allocates a first portion of the theoretical expected payout percentage for the wagering game to the prize value of the secondary contest and allocates a second portion of the theoretical expected payout percentage to all other potential payouts for the wagering game (e.g., based on a total prize value of $3000, the system 300 allocates 20% of the 86% theoretical expected payout to the secondary contest and allocates the remaining 66% of the 86% theoretical expected payout to payouts made by default functionality of the wagering game).

The flow 600 continues at processing block 606, where the system provides the second math rules to use, instead of the first math rules, to compute the payouts for the wagering game, after initiation of the secondary contest. For example, in FIG. 4, when the secondary contest begins, the system 300 swaps the first math file 381 with the second math file 382. The wagering game, therefore, uses the 66% theoretical expected payout percentage (in the second math file 382) instead of the 86% theoretical expected payout percentage (in the first math file 381) to compute payouts during the secondary contest duration for default wagering game functionality (e.g., for winning reel symbol configurations of the wagering game, for bonus game payouts of the wagering game, etc.). The wagering game uses the 20% theoretical expected payout percentage to compute the payouts for the secondary contest (when and if made). Thus, the system can award both the secondary contest prize and additional game payouts using the same math file within the same time period. For instance, in FIG. 4, on the same spin, the wagering game experienced a payout for the secondary contest (e.g., the appearance of the transient symbol(s) 335 in the payline 340) as well as a payout for the wagering game (e.g., the appearance of shamrock symbols that align in the payline 342). The secondary contest pays out 50000 credits (e.g., the $500 prize for the secondary contest) for the appearance of the transient symbol(s) 335 in the payline 340 and the wagering game pays out 500 credits (e.g., $5) for the appearance of the three shamrock symbols in the payline 342. Computation of the 50000 credits is associated with the 20% theoretical expected payout percentage allocated to secondary contest payouts, whereas computation of the 500 credits is associated with the 66% theoretical expected payout percentage allocated to wagering game payouts. The system does not have to switch out the second math file 382 as soon as the secondary contest prize is awarded because there is still a lesser portion of the theoretical expected payout percentage allocated to the other payouts and because the system 300 can regulate (based on the configuration tool) a limit to an amount of payouts made for the secondary contest. Furthermore, in some embodiments, the system can provide a math file that has a lower, or partial, theoretical expected payout percentage allocated to wagering game payouts. For example, the system can cause the 86% expected payout percentage to be allocated 60% to wagering game payouts and 20% to secondary contest prizes, leaving out 6% for the duration of the secondary contest. By doing this, the system may payout less than the 86% expected percentage, resulting in a surplus, which the system can pay out subsequently in various ways described further below.

The flow 600 continues at processing block 608, where the system determines whether the secondary contest ends. If the secondary contest does not end, the processing block 608 repeats. If the secondary contest ends, the system automatically stops using the second math file and returns to using the first math file. For example, in FIG. 5, at 12 AM, the end time for the secondary contest, the system 300 replaces the second math file 382 with the first math file 381 and the wagering game returns to using the first math file 381.

The flow 600 continues at processing block 610, where the system determines whether a full amount of a value for the one or more prizes are awarded for the secondary contest. If the full amount was awarded, the flow 600 ends. If not, then the 600 continues at processing block 612, where the system calculates a differential between the full amount of the value and an amount paid out of value. More specifically, if more, or less, than the value of the secondary contest prize(s) (e.g., value 334) is paid out, then a differential results between what was allocated for the payout of the prize and what was actually paid out. If less than the full value is paid out, a positive differential, or surplus, results which then can be paid out later. If more than the full value is paid out, a negative differential, or deficit, can result.

The flow 600 continues at processing block 614, where the system pays out a surplus differential after the secondary contest ends. In one example, the system can offer mystery prizes or bonus wins to compensate for an expected payout surplus. In another example, a wagering game may have the ability to control how much award money is awarded during any given bonus game. Therefore, the system can increase the amounts of bonus awards, such as by adding multipliers or triggering the bonus game more frequently. In another example, the system can apportion the surplus into a progressive jackpot to be awarded at some time in the future. Any additional payouts can be awarded to the current player (e.g., as an immediate mystery prize to the player, in a subsequent spin/award to the player, later in the gaming session to the player, etc.), or it can be awarded in subsequent wagering game sessions on the wagering game machine, either to the player or to other players (e.g., as bonus payouts in future gaming sessions, as the progressive jackpot for the wagering game machine, etc.).

In some embodiments, the prize differential may be negative. For example, if the prize values for a secondary contest are variable, the amount paid out during the secondary contest may end up being more than an anticipated prize value (i.e., more than the differential). For example, there may be a range of possible prizes in the secondary contest that range from $500 to $5,000. Thus, the game may allocate a portion of the expected payout percentage for the secondary contest to be a certain amount (e.g., 20%) based on an average of the range (e.g., the average value for the range of possible prizes equates to $2,000, which is less than the potential high end payout of $5000). Therefore, if the secondary contest actually ends up paying more than the average secondary contest prize value (e.g., actually pays out $3000 in prizes, which is $1000 greater than the average of $2000), then an overpayment of expected prize value occurs. Consequently, in some embodiments, the system can reduce a value of variable game payouts after the secondary contest, reduce a frequency that bonus events occur, reduce a number of high paying symbols used in the wagering game, etc.

Additional Example Embodiments

According to some embodiments, a wagering game system ("system") can provide various example devices, operations, etc., to incorporate transient symbols, or other transient values, into wagering games according to parameters of a temporary secondary contest. The following non-exhaustive list enumerates some possible embodiments.

Modifying Rule Sets in a Wagering Game Based on Inclusion of Transient Symbols.

In some examples, such as the example described in FIG. 6, the system can provide updated math rules. In some instances, the math rules modify math factors according to payouts for the prizes of the secondary contest, such as allocating a portion of an expected payout percentage to payouts of promotional awards, as described in FIG. 6. In other examples, however, the system does not payout promotional awards via the wagering game. In other words, the promotional prizes are not funded by game wagers (e.g., are funded by marketing funds), and therefore, the payout via of the promotional awards for the secondary contest do not affect an overall payout associated with the wagering game. In some examples, therefore, the system can provide a second math rules that specify that configurations of symbols in the wagering game that refer to promotional awards are to be factored, for purposes of wagering game payouts, as non-winning configurations in the wagering game. In some embodiments, instead of making a promotional award via the wagering game, the system can indicate that the promotional award is made and store in the player account an indication of the prize. The player can then redeem the award at a later time or location by accessing the indication of the promotional award stored in the player account.

In other examples, the system provides math rules that take into account a number of the transient symbols that are added to and/or that replace symbols of a default symbol set. For instance, if the system replaces some symbols from the default symbol set, the system can provide new math rules that specify odds of given symbol configurations based on a number of symbols in the updated symbol set. The system can also provide information to update a pay table based on the transient symbols (e.g., if inclusion of the transient symbols change the odds of occurrence of the default symbols, then the system can provide an updated file for the game that specifies what the new odds are, or what the new possible symbol configurations will look like, for the wagering game during the secondary contest).

In other embodiments, the system can provide updated rules other than, or in addition to, math rules. For example, the system can provide updated symbol presentation rules to indicate how to present transient symbols, what graphics or animations to present with the transient symbols, what effects to present (e.g., visual and audio effects) when transient symbols appear, and so forth.

Transient Values for Existing Wagering Game Symbols.

Figure 8:
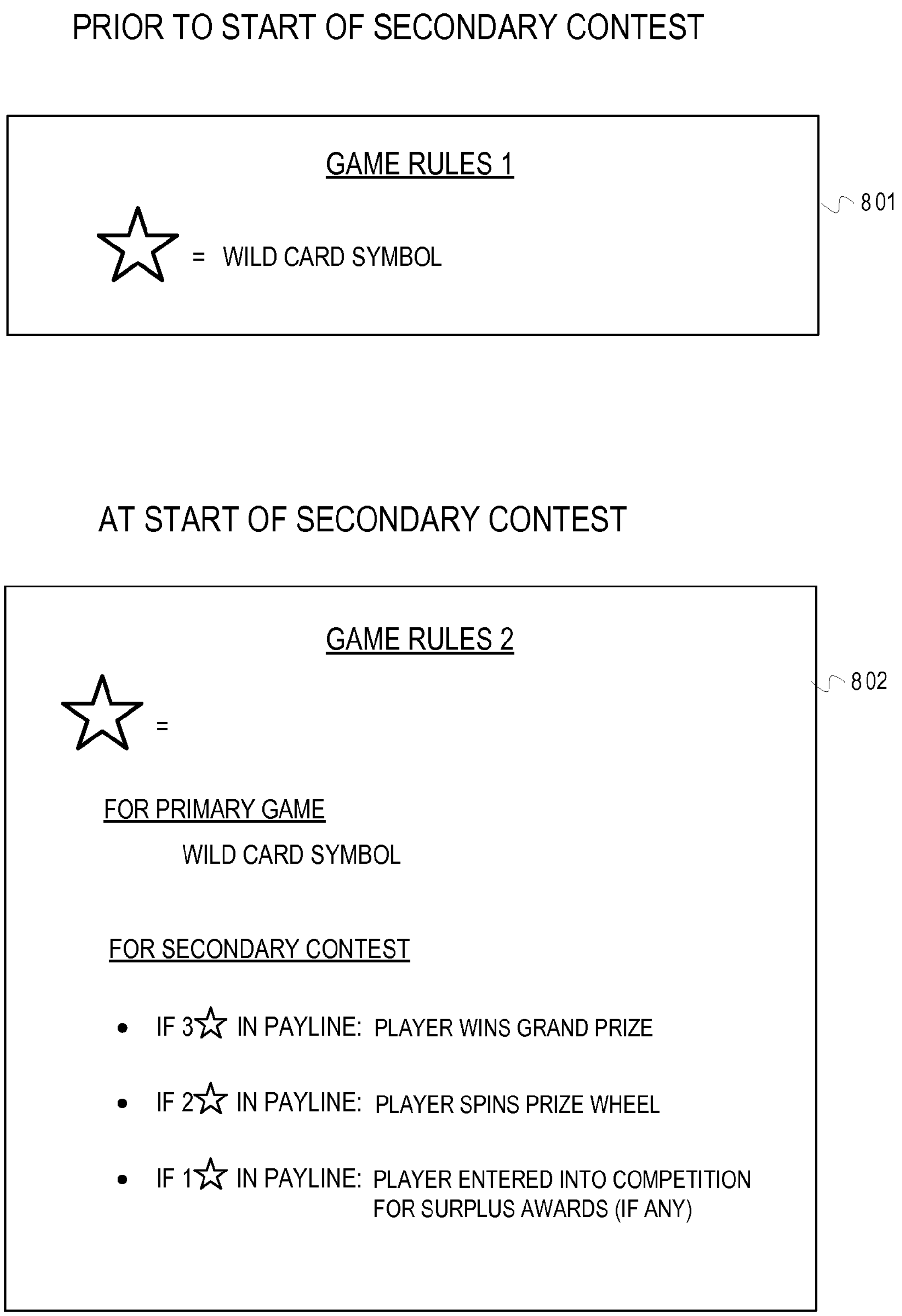
FIG. 8 is an illustration of adapting game rules of a wagering game to values associated with a temporary secondary contest, according to some embodiments.

In some embodiments, upon initiation of the secondary contest, instead of using new symbols, the system associates one or more new values to a set of symbols already being used in the wagering game (e.g., in the primary wagering game or in a bonus game associated with the primary wagering game). The one or more new values are only available for a duration of the secondary contest. For example, the system modifies values of one or more default symbols used in the wagering game. FIG. 8 illustrates an example. In FIG. 8, prior to the secondary contest, the wagering game uses first game rules 801. In the first game rules 801, a value for one of the default wagering game symbols (e.g., the "star" symbol) is treated as a "wildcard" when presented in the wagering game. In other words, if one or more star symbols appear in the wagering game, then any of the one or more star symbols substitute for any other of the reel symbols in the default reel symbol set. However, upon initiation of the secondary contest, the system assigns new, second value(s) to the star symbol. In some embodiments, the new, second value(s) differs from the first value. In some embodiments, the new, second value(s) adds to the first values. For example, upon initiation of the secondary contest, as indicated in the second game rules 802, in addition to the star symbol functioning like a wildcard symbol, the star symbol becomes an indicator of an award of a prize in the secondary contest, a chance to choose a prize in the secondary contest, or a chance to compete for a prize in the secondary contest (e.g., three star symbols in a payline means that a player instantly wins the grand prize in the secondary contest, two star symbols in a payline means that the player can spin a prize wheel with prizes for the secondary contest, and one star symbol in an payline means that the player is selected to compete in a group competition for surplus secondary contest prizes if any exist after the secondary contest ends). The assignment of the new, second value(s) is temporary (i.e., only for the duration of the secondary contest). Thus, the new, second value(s) assigned to the portion of the default set of symbols for the secondary contest may be referred to as "transient values". Once the new values are assigned, the portion of the set of symbols to which the new values were assigned may be referred to as the transient symbol set because the value for the symbols is only temporary and will revert back to their original values after the secondary contest ends.

In another example, the system modifies values of one or more bonus game symbols used in the wagering game. For instance, prior to initiation of the secondary contest, the wagering game includes a symbol that reads "wheel" on it (i.e., the "wheel" symbol). When one or more of the wheel symbols appear in the wagering game, in one or more specific configurations, the system provides an opportunity to spin a bonus wheel. Before the secondary contest begins, the bonus prize wheel has various wheel portions for differing values of bonus prize values based on the player's wager amount in the primary wagering game. The bonus prize wheel also includes one or more wheel portions that say "jackpot" which, before the secondary contest begins, correspond to an award for a progressive jackpot. After the secondary contest begins, however, the "jackpot" portion(s) of the wheel correspond to the secondary contest prize value instead of, or in addition to, the progressive jackpot amount. Other portions of the wheel can add, or replace, bonus prize values for additional secondary contest prize values. Thus, during the secondary contest, after the wheel symbol appears in the wagering game, when the player spins the wheel, the player has the opportunity to win secondary contest prizes instead of, or in addition to, bonus prizes.

In some embodiments, the number of wheel portions related to the secondary contest prizes can vary based on a total value for the secondary contest prizes. For example, if the secondary contest prize is worth $200, then there may be twenty jackpot wheel portions, out of eighty total bonus wheel portions. If, however, the secondary contest prize is worth $2000, then only two of the bonus wheel portions, out of eighty, would say "jackpot." The system can vary the number of wheel portions that relate to the secondary contest prize(s) to adjust odds of winning the secondary contest prize(s). If, as the secondary contest draws near its end, if a specific amount or value or secondary contest prizes have not yet been awarded (i.e., a positive or surplus differential exists as descried previously), the system can dynamically alter the number of portions of the wheel that relate to secondary contest prizes to increase odds of winning more of the secondary contest prizes. Furthermore, the system can alter bonus prize values on the other portions of the wheel that relate to prizes not related to the secondary contest to adjust potential amounts of payout according to theoretical payout percentages indicated in a math file using during the secondary contest.

In some embodiments, the number of wheel portions related to the secondary contest prizes can vary based on a player's individual betting patterns. For example, if the player increases their average bet in the wagering game, then the system can proportionately increase the number of wheel portions that relate to the secondary contest prizes to increase the odds of the player winning the secondary contest prize(s).

Incorporating Transient Symbols Based on Player Location.

In some embodiments, the system activates a transient symbol set only if a player is located in a specific geographic location, within a given location within a casino, near another player, etc. The system can utilize tracking technologies, such as RFID chips on player tracking cards or global-positioning systems included in smartphones that belong to the players.

Incorporating Transient Symbols Based on Group Conditions.

In some embodiments, the system requires that a specific number of players participate in the secondary contest or perform activities concurrently with, or on conjunction with, the secondary contest, before the system will activate the transient symbol set. In another example, the system requires a player's social contact (e.g., friend, family, etc.) to coordinate activities during the secondary contest. For instance, the system requires that when one or more symbols from the transient symbol set appears for a player, for the player to be eligible for a secondary contest prize, one of the player's social contacts needs to have been playing within a given time period prior to the beginning of the secondary contest.

Incorporating Transient Symbols Based on Player History.

In some examples, the system may initiate a secondary contest or provide specific prizes for the secondary contest given player history (e.g., spin counts, card hands played, amounts wagered, etc.) of the wagering game. For instance, for the first fifteen hundred spins on a given wagering game, the system provides a first transient symbol set with first prize values. For the next thousand spins, the system provides a second transient symbol set with second prize values higher than the first. Therefore, in some examples, such as for a secondary contest that utilize strictly set time periods during which certain transient symbol sets are offered, the access to given transient symbol sets may be equal for all players on a network. In other example, however, where the transience of the symbols is based on personal player history, then the access to the transient symbol set(s) may be different for each player.

Incorporating Transient Symbols with Progressives.

In some examples, the prize for the secondary contest may be tied to a progressive game. For instance, if the prize is not won during the secondary contest period, the prize may be assigned to a progressive games' payout. In another example, the secondary contest may incorporate a progressive game that is funded, at least in part, by wagers made from the wagering game.

Incorporating Transient Symbols with a Game Show.

In some examples, the format for the secondary contest may include a game show. For instance, any number of players can be incorporated into a game-show type secondary contest where a host appears on the game displays for all players and hosts the secondary contest. All players in the game, therefore, are eligible to utilize transient symbols sets for the duration of the secondary contest.

Example Operating Environments

This section describes example operating environments, systems, networks, etc. and presents structural aspects of some embodiments.

Wagering Game System Architecture

Figure 9:
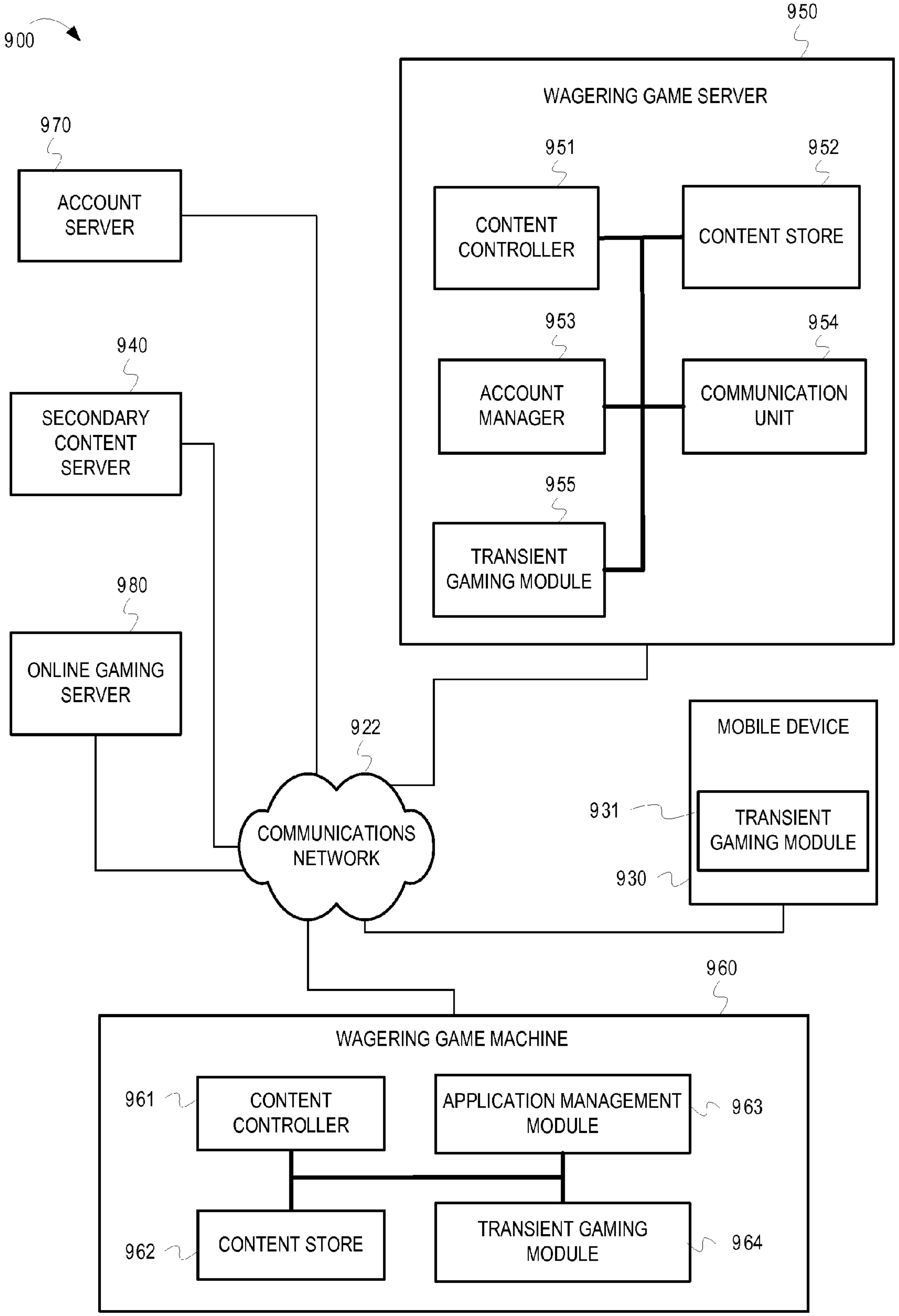
FIG. 9 is an illustration of a wagering game system architecture 900, according to some embodiments.

FIG. 9 is a conceptual diagram that illustrates an example of a wagering game system architecture 900, according to some embodiments. The wagering game system architecture 900 can include an account server 970 configured to control user related accounts accessible via wagering game networks and social networking networks. The account server 970 can store wagering game player account information, such as account settings (e.g., settings related to group games, etc., settings related to social contacts, etc.), preferences (e.g., player preferences regarding content presentable via an application of a mobile device, player preferences regarding award types, preferences related to virtual assets, etc.), player profile data (e.g., name, avatar, screen name, etc.), and other information for a player's account (e.g., financial information, account identification numbers, virtual assets, social contact information, etc.). The account server 970 can contain lists of social contacts referenced by a player account. The account server 970 can also provide auditing capabilities, according to regulatory rules. The account server 970 can also track performance of players, machines, and servers.

The wagering game system architecture 900 can also include a wagering game server 950 configured to control wagering game content, provide random numbers, and communicate wagering game information, account information, and other information to and from a wagering game machine 960. The wagering game server 950 can include a content controller 951 configured to manage and control content for presentation on the wagering game machine 960. For example, the content controller 951 can generate game results (e.g., win/loss values), including win amounts, for games played on the wagering game machine 960. The content controller 951 can communicate the game results to the wagering game machine 960. The content controller 951 can also generate random numbers and provide them to the wagering game machine 960 so that the wagering game machine 960 can generate game results. The wagering game server 950 can also include a content store 952 configured to contain content to present on the wagering game machine 960. The wagering game server 950 can also include an account manager 953 configured to control information related to player accounts. For example, the account manager 953 can communicate wager amounts, game results amounts (e.g., win amounts), bonus game amounts, etc., to the account server 970. The wagering game server 950 can also include a communication unit 954 configured to communicate information to the wagering game machine 960 and to communicate with other systems, devices and networks. The wagering game server 950 can also include a transient gaming module 955 configured to incorporate transient symbol sets into wagering games.

The wagering game system architecture 900 can also include the wagering game machine 960 configured to present wagering games. The wagering game machine 960 can include a content controller 961 configured to manage and control content and presentation of content on the wagering game machine 960. The wagering game machine 960 can also include a content store 962 configured to contain content to present on the wagering game machine 960. The wagering game machine 960 can also include an application management module 963 configured to manage multiple instances of gaming applications. For example, the application management module 963 can be configured to launch, load, unload and control applications and instances of applications. The application management module 963 can launch different software players (e.g., a Microsoft® Silverlight™ player, an Adobe® Flash® player, etc.) and manage, coordinate, and prioritize what the software players do. The application management module 963 can also coordinate instances of server applications in addition to local copies of applications. The application management module 963 can control window locations on a wagering game screen or display for the multiple gaming applications. In some embodiments, the application management module 963 can manage window locations on multiple displays including displays on devices associated with and/or external to the wagering game machine 960 (e.g., a top display and a bottom display on the wagering game machine 960, a peripheral device connected to the wagering game machine 960, a mobile device connected to the wagering game machine 960, etc.). The application management module 963 can manage priority or precedence of client applications that compete for the same display area. For instance, the application management module 963 can determine each client application's precedence. The precedence may be static (i.e. set only when the client application first launches or connects) or dynamic. The applications may provide precedence values to the application management module 963, which the application management module 963 can use to establish order and priority. The precedence, or priority, values can be related to tilt events, administrative events, primary game events (e.g., hierarchical, levels, etc.), secondary game events, local bonus game events, advertising events, etc. As each client application runs, it can also inform the application management module 963 of its current presentation state. The applications may provide presentation state values to the application management module 963, which the application management module 963 can use to evaluate and assess priority. Examples of presentation states may include celebration states (e.g., indicates that client application is currently running a win celebration), playing states (e.g., indicates that the client application is currently playing), game starting states (e.g., indicates that the client application is showing an invitation or indication that a game is about to start), status update states (e.g., indicates that the client application is not 'playing' but has a change of status that should be annunciated, such as a change in progressive meter values or a change in a bonus game multiplier), idle states (e.g., indicates that the client application is idle), etc. In some embodiments, the application management module 963 can be pre-configurable. The system can provide controls and interfaces for operators to control screen layouts and other presentation features for the configuring of the application management module 963. The application management module 963 can communicate with, and/or be a communication mechanism for, a base game stored on a wagering game machine. For example, the application management module 963 can communicate events from the base game such as the base game state, pay line status, bet amount status, etc. The application management module 963 can also provide events that assist and/or restrict the base game, such as providing bet amounts from secondary gaming applications, inhibiting play based on gaming event priority, etc. The application management module 963 can also communicate some (or all) financial information between the base game and other applications including amounts wagered, amounts won, base game outcomes, etc. The application management module 963 can also communicate pay table information such as possible outcomes, bonus frequency, etc. In some embodiments, the application management module 963 can control different types of applications. For example, the application management module 963 can perform rendering operations for presenting applications of varying platforms, formats, environments, programming languages, etc. For example, the application management module 963 can be written in one programming language format (e.g., JavaScript, Java, C++, etc.) but can manage, and communicate data from, applications that are written in other programming languages or that communicate in different data formats (e.g., Adobe® Flash®, Microsoft® Silverlight™, Adobe® Air™, hyper-text markup language, etc.). The application management module 963 can include a portable virtual machine capable of generating and executing code for the varying platforms, formats, environments, programming languages, etc. The application management module 963 can enable many-to-many messaging distribution and can enable the multiple applications to communicate with each other in a cross-manufacturer environment at the client application level. For example, multiple gaming applications on a wagering game machine may need to coordinate many different types of gaming and casino services events (e.g., financial or account access to run spins on the base game and/or run side bets, transacting drink orders, tracking player history and player loyalty points, etc.).

The wagering game machine 960 can also include a transient gaming module 964 configured to incorporate transient symbol sets into wagering games.

The wagering game system architecture 900 can also include the secondary content server 940 configured to provide content and control information for secondary games and other secondary content available on a wagering game network (e.g., secondary wagering game content, promotions content, advertising content, player tracking content, web content, etc.). The secondary content server 940 can provide "secondary" content, or content for "secondary" games presented on the wagering game machine 960. "Secondary" in some embodiments can refer to an application's importance or priority of the data. In some embodiments, "secondary" can refer to a distinction, or separation, from a primary application (e.g., separate application files, separate content, separate states, separate functions, separate processes, separate programming sources, separate processor threads, separate data, separate control, separate domains, etc.). Nevertheless, in some embodiments, secondary content and control can be passed between applications (e.g., via application protocol interfaces), thus becoming, or falling under the control of, primary content or primary applications, and vice versa. In some embodiments, the secondary content can be in one or more different formats, such as Adobe® Flash®, Microsoft® Silverlight™, Adobe® Air™, hyper-text markup language, etc. In some embodiments, the secondary content server 940 can provide and control content for community games, including networked games, social games, competitive games, or any other game that multiple players can participate in at the same time. In some embodiments, the secondary content server 940 can control and present an online website that hosts wagering games. The secondary content server 940 can also be configured to present multiple wagering game applications on the wagering game machine 960 via a wagering game website, or other gaming-type venue accessible via the Internet. The secondary content server 940 can host an online wagering website and/or a social networking website. The secondary content server 940 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The secondary content server 940 can also be configured to provide content presentable via an application of the mobile device 930. In some embodiments, the secondary content server 940 can also host social networking accounts, provide social networking content, control social networking communications, store associated social contacts, etc. The secondary content server 940 can also provide chat functionality for a social networking website, a chat application, or any other social networking communications mechanism. In some embodiments, the secondary content server 940 can utilize player data to determine marketing promotions that may be of interest to a player account. The secondary content server 940 can also analyze player data and generate analytics for players, group players into demographics, integrate with third party marketing services and devices, etc. The secondary content server 940 can also provide player data to third parties that can use the player data for marketing. In some embodiments, the secondary content server 940 can provide one or more social networking communication mechanisms that publish (e.g., post, broadcast, etc.) a message to a mass (e.g., to multiple people, users, social contacts, accounts, etc.). The social networking communication mechanism can publish the message to the mass simultaneously. Examples of the published message may include, but not be limited to, a blog post, a mass message post, a news feed post, a profile status update, a mass chat feed, a mass text message broadcast, a video blog, a forum post, etc. Multiple users and/or accounts can access the published message and/or receive automated notifications of the published message.

The wagering game system architecture 900 can also include the online gaming server 980 configured to control and present a website that hosts gaming related content (e.g., monetary type wagering games, non-monetary type wagering games, social networking content related to gaming, etc.). The online gaming server 980 can be configured to present multiple applications on the website via the Internet. The online gaming server 980 can host a social network. The online gaming server 980 can include other devices, servers, mechanisms, etc., that provide functionality (e.g., controls, web pages, applications, etc.) that web users can use to connect to a social networking application and/or website and utilize social networking and website features (e.g., communications mechanisms, applications, etc.). The online gaming server 980 can also be configured to provide content presentable via an application of the mobile device 930.

The wagering game system architecture 900 can also include the mobile device 930 configured to control mobile communications and applications. The mobile device 930 may also be referred to as a handheld device, a handheld computer or simply handheld. In some embodiments, the mobile device 930 is a pocket-sized computing device, having a display screen with touch input and/or a miniature keyboard. Some examples of the mobile device 930 may include, but are not limited to, a smartphone, a personal digital assistant, a mobile computer, a mobile internet device, a portable media player, a mobile phone, a pager, a personal navigation device, etc. In some embodiments, the mobile device 930 functions via a wireless application protocol (WAP). In some embodiments, the mobile device 930 may include integrated data capture devices like barcode readers, radio frequency identification (RFID) readers, In-cell Optical LCD readers, and smart card readers. In some embodiments, the mobile device 930 is configured to communicate with wagering game devices, such as the wagering game server 950, the wagering game machine 960, the online gaming server 980, the secondary content server 940, and the account server 970. In some embodiments the mobile device 930 is personal (i.e., belongs to a user), which the user can carry on their person. The mobile device 930 can include a transient gaming module 931 configured to incorporate transient symbol sets into wagering games.

Each component shown in the wagering game system architecture 900 is shown as a separate and distinct element connected via a communications network 922. However, some functions performed by one component could be performed by other components. For example, the wagering game server 950 can also be configured to perform functions of the application management module 963, and other network elements and/or system devices. Furthermore, the components shown may all be contained in one device, but some, or all, may be included in, or performed by, multiple devices, as in the configurations shown in FIG. 9 or other configurations not shown. For example, the account manager 953 and the communication unit 954 can be included in the wagering game machine 960 instead of, or in addition to, being a part of the wagering game server 950. Further, in some embodiments, the wagering game machine 960 can determine wagering game outcomes, generate random numbers, etc. instead of, or in addition to, the wagering game server 950.

The wagering game machines described herein (e.g., wagering game machine 960) can take any suitable form, such as floor standing models, handheld mobile wagering game machines, bar-top models, workstation-type console models, surface computing machines, etc. Further, wagering game machines can be primarily dedicated for use in conducting wagering games.

In some embodiments, wagering game machines and wagering game servers work together such that wagering game machines can be operated as thin, thick, or intermediate clients. For example, one or more elements of game play may be controlled by the wagering game machines (client) or the wagering game servers (server). Game play elements can include executable game code, lookup tables, configuration files, game outcome, audio or visual representations of the game, game assets or the like. In a thin-client example, the wagering game server can perform functions such as determining game outcome or managing assets, while the wagering game machines can present a graphical representation of such outcome or asset modification to the user (e.g., player). In a thick-client example, the wagering game machines can determine game outcomes and communicate the outcomes to the wagering game server for recording or managing a player's account.

In some embodiments, either the wagering game machines (client) or the wagering game server(s) can provide functionality that is not directly related to game play. For example, account transactions and account rules may be managed centrally (e.g., by the wagering game server(s)) or locally (e.g., by the wagering game machines). Other functionality not directly related to game play may include power management, presentation of advertising, software or firmware updates, system quality or security checks, etc.

Furthermore, the wagering game system architecture 900 can be implemented as software, hardware, any combination thereof, or other forms of embodiments not listed. For example, any of the network components (e.g., the wagering game machines, servers, etc.) can include hardware and machine-readable storage media including instructions for performing the operations described herein.

Wagering Game Machine Architecture

Figure 10:
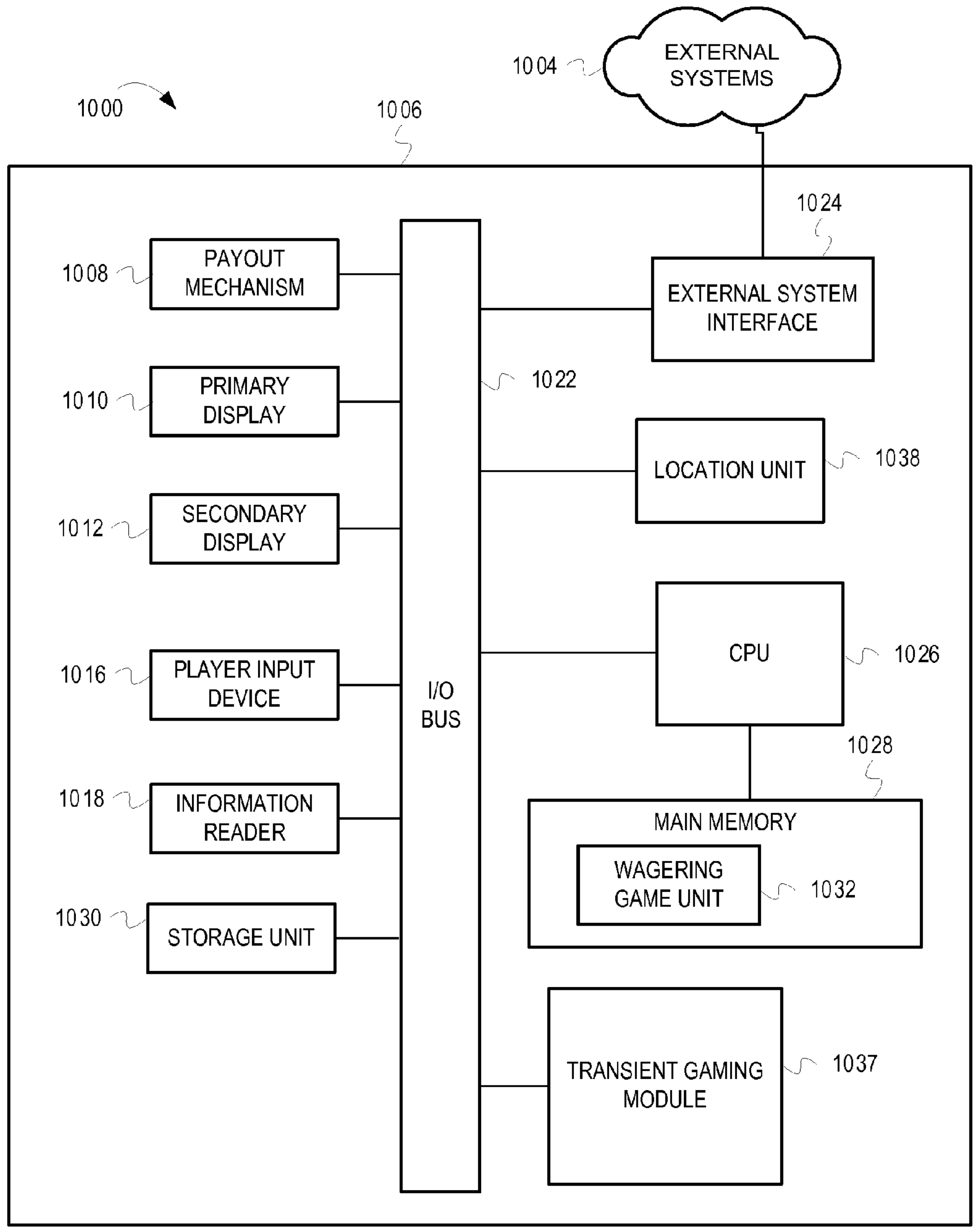
FIG. 10 is an illustration of a wagering game machine architecture 1000, according to some embodiments.

FIG. 10 is a conceptual diagram that illustrates an example of a wagering game machine architecture 1000, according to some embodiments. In FIG. 10, the wagering game machine architecture 1000 includes a wagering game machine 1006, which includes a central processing unit (CPU) 1026 connected to main memory 1028. The CPU 1026 can include any suitable processor, such as an Intel® Pentium processor, Intel® Core 2 Duo processor, AMD Opteron™ processor, or UltraSPARC processor. The main memory 1028 includes a wagering game unit 1032. In some embodiments, the wagering game unit 1032 can present wagering games, such as video poker, video black jack, video slots, video lottery, reel slots, etc., in whole or part.

The CPU 1026 is also connected to an input/output ("I/O") bus 1022, which can include any suitable bus technologies, such as an AGTL+frontside bus and a PCI backside bus. The I/O bus 1022 is connected to a payout mechanism 1008, primary display 1010, secondary display 1012, value input device 1014, player input device 1016, information reader 1018, and storage unit 1030. The player input device 1016 can include the value input device 1014 to the extent the player input device 1016 is used to place wagers. The I/O bus 1022 is also connected to an external system interface 1024, which is connected to external systems 1004 (e.g., wagering game networks). The external system interface 1024 can include logic for exchanging information over wired and wireless networks (e.g., 802.11g transceiver, Bluetooth transceiver, Ethernet transceiver, etc.)

The I/O bus 1022 is also connected to a location unit 1038. The location unit 1038 can create player information that indicates the wagering game machine's location/movements in a casino. In some embodiments, the location unit 1038 includes a global positioning system (GPS) receiver that can determine the wagering game machine's location using GPS satellites. In other embodiments, the location unit 1038 can include a radio frequency identification (RFID) tag that can determine the wagering game machine's location using RFID readers positioned throughout a casino. Some embodiments can use GPS receiver and RFID tags in combination, while other embodiments can use other suitable methods for determining the wagering game machine's location. Although not shown in FIG. 10, in some embodiments, the location unit 1038 is not connected to the I/O bus 1022.

In some embodiments, the wagering game machine 1006 can include additional peripheral devices and/or more than one of each component shown in FIG. 10. For example, in some embodiments, the wagering game machine 1006 can include multiple external system interfaces 1024 and/or multiple CPUs 1026. In some embodiments, any of the components can be integrated or subdivided.

In some embodiments, the wagering game machine 1006 includes a transient gaming module 1037. The transient gaming module 1037 can process communications, commands, or other information, where the processing can incorporate transient symbols into wagering games.

Furthermore, any component of the wagering game machine 1006 can include hardware, firmware, and/or machine-readable storage media including instructions for performing the operations described herein.

Wagering Game System

Figure 11:
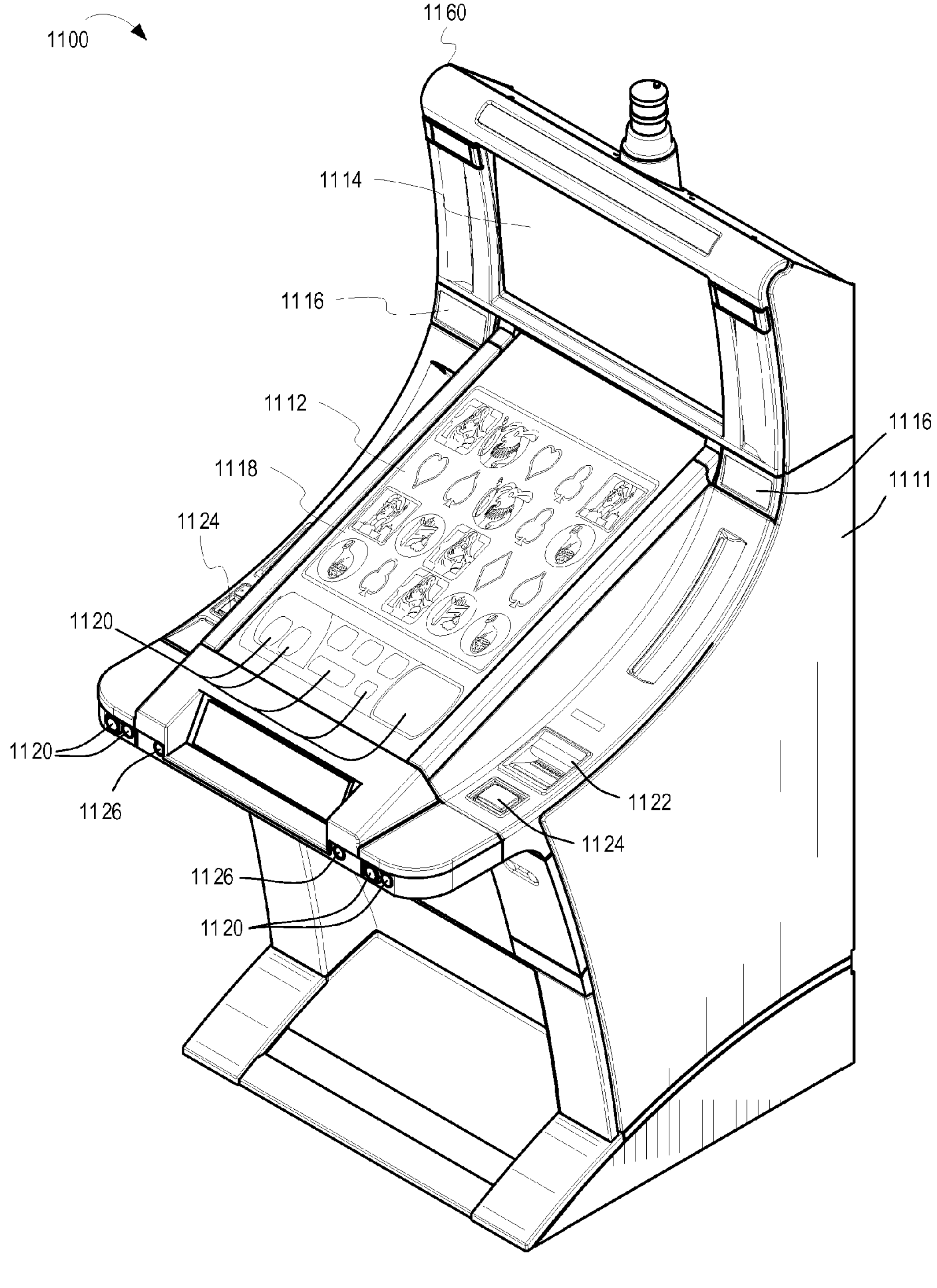
FIG. 11 is an illustration of a wagering game system 1100, according to some embodiments.

FIG. 11 is a conceptual diagram that illustrates an example of a wagering game system 1100, according to some embodiments. In FIG. 11, the wagering game system 1100 includes a wagering game machine 1160 similar to those used in gaming establishments, such as casinos. The wagering game machine 1160 may, in some examples, be referred to as a gaming terminal or an electronic gaming machine. The wagering game machine 1160 may have varying structures and methods of operation. For example, the wagering game machine 1160 may include electromechanical components configured to play mechanical slots. In another example, the 1160 includes electronic components configured to play a video casino game, such as slots, keno, poker, blackjack, roulette, craps, etc. The wagering game machine 1160 is depicted as a floor-standing model. However, other examples of wagering game machines include handheld mobile units, bartop models, workstation-type console models, etc. Further, the wagering game machine 1160 may be primarily dedicated for use in conducting wagering games, or may include non-dedicated devices, such as mobile phones, personal digital assistants, personal computers, etc. Exemplary types of wagering game machines are disclosed in U.S. Pat. No. 6,517,433 and Patent Application Publication Nos. US2010/0062196 and US2010/0234099, which are incorporated herein by reference in their entireties.

The wagering game machine 1160 illustrated in FIG. 11 comprises a cabinet 1111 that may house various input devices, output devices, and input/output devices. By way of example, the wagering game machine 1160 includes a primary display area 1112, a secondary display area 1114, and one or more audio speakers 1116. The primary display area 1112 or the secondary display area 1114 may include one or more of a cathode ray tube (CRT), a high resolution liquid crystal display (LCD), a plasma display, a light emitting diode (LED) display, a three-dimensional (3D) display, a video display, or a combination thereof. In some examples, the primary display area 1112 or the secondary display area 1114 includes mechanical reels to display a wagering game outcome. In some example, the primary display area 1112 or the secondary display area 1114 present a transmissive video display disposed in front of a mechanical-reel display to portray a video image superimposed upon the mechanical-reel display. In FIG. 11, the wagering game machine 1160 is a "slant-top" version in which the primary display 1112 is slanted (e.g., at about a thirty-degree angle toward the player of the wagering game machine 1160). Another example of wagering game machine 1160 is an "upright" version in which the primary display 1114 is oriented vertically relative to the player. The display areas may variously display information associated with wagering games, non-wagering games, community games, progressives, advertisements, services, premium entertainment, text messaging, emails, alerts, announcements, broadcast information, subscription information, etc. appropriate to the particular mode(s) of operation of the wagering game machine 1160. The wagering game machine 1160 includes a touch screen(s) 1118 mounted over the primary or secondary areas, buttons 1120 on a button panel, bill validator 1122, information reader/writer(s) 1124, and player-accessible port(s) 1126 (e.g., audio output jack for headphones, video headset jack, USB port, wireless transmitter/receiver, etc.).

It should be understood that numerous other peripheral devices and other elements exist and are readily utilizable in any number of combinations to create various forms of a wagering game machine in accord with the present concepts.

Input devices, such as the touch screen 1118, buttons 1120, a mouse, a joystick, a gesture-sensing device, a voice-recognition device, and a virtual input device, accept player input(s) and transform the player input(s) to electronic data signals indicative of the player input(s), which correspond to an enabled feature for such input(s) at a time of activation (e.g., pressing a "Max Bet" button or soft key to indicate a player's desire to place a maximum wager to play the wagering game). The input(s), once transformed into electronic data signals, are output to a CPU for processing. The electronic data signals are selected from a group consisting essentially of an electrical current, an electrical voltage, an electrical charge, an optical signal, an optical element, a magnetic signal, and a magnetic element.

Embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible medium of expression having computer readable program code embodied in the medium. The described embodiments may be provided as a computer program product that may include a machine-readable storage medium having stored thereon instructions, which may be used to program a computer system to perform a process according to embodiments(s), whether presently described or not, because every conceivable variation is not enumerated herein. A machine-readable storage medium includes any mechanism that stores information in a form (e.g., software, processing application) readable by a machine (e.g., a computer). For example, machine-readable storage media includes magnetic storage medium (e.g., floppy diskette), read only memory (ROM), random access memory (RAM), magnetic disk storage media, optical storage media (e.g., CD-ROM), magneto-optical storage media, flash memory, erasable programmable memory (e.g., EPROM and EEPROM), or other types of media suitable for storing electronic instructions. In addition, embodiments may be embodied in a machine-readable signal media, such as any media suitable for transmitting software over a network.

General

This detailed description refers to specific examples in the drawings and illustrations. These examples are described in sufficient detail to enable those skilled in the art to practice the inventive subject matter. These examples also serve to illustrate how the inventive subject matter can be applied to various purposes or embodiments. Other embodiments are included within the inventive subject matter, as logical, mechanical, electrical, and other changes can be made to the example embodiments described herein. Features of various embodiments described herein, however essential to the example embodiments in which they are incorporated, do not limit the inventive subject matter as a whole, and any reference to the invention, its elements, operation, and application are not limiting as a whole, but serve only to define these example embodiments. This detailed description does not, therefore, limit embodiments, which are defined only by the appended claims. Each of the embodiments described herein are contemplated as falling within the inventive subject matter, which is set forth in the following claims.

The invention claimed is:

1. A method of operating a gaming system, said method comprising:

electronically connecting, via a network interface device of the gaming system, with a wagering game machine configured to present an electronic wagering game via one or more electronic output devices of the wagering game machine, wherein the electronic wagering game includes a first symbol set used to indicate one or more wagering game outcomes before initiation of a secondary contest, wherein the wagering game machine includes a value input device configured to receive physical money to increase a credit balance of the wagering game machine proportional to a monetary value of the physical money, wherein the credit balance is usable for placement of one or more wagers on the electronic wagering game;

initiating, by at least one of one or more electronic processing devices of the gaming system, the secondary contest in response to a condition that occurs other than from the electronic wagering game;

selecting, by at least one of the one or more electronic processing devices, a second symbol set for use during the secondary contest;

incorporating, via at least one of the one or more electronic processing devices, at least one or more portions of the second symbol set into the first symbol set of the electronic wagering game forming a temporary combined symbol set for the electronic wagering game, wherein the incorporating the one or more portions of the second symbol set into the first symbol set of the electronic wagering game comprises incorporating different portions of the second symbol set for different portions of the secondary contest;

providing an award in response to at least one winning outcome in the electronic wagering game that used the temporary combined symbol set;

ending the secondary contest; and removing the at least the one or more portions of the second symbol set from the first symbol set of the electronic wagering game after the secondary contest ends.

2. The method of claim 1 further comprising:

determining that a trigger occurs for presentation of one or more symbols from the second symbol set; and awarding one or more prizes for the secondary contest based on occurrence of the trigger.

3. The method of claim 1 further comprising modifying one or more values for the at least the one or more portions of the second symbol set for sequential periods of the secondary contest.

4. The method of claim 1 further comprising modifying one or more values for the at least the one or more portions of the second symbol set based on one or more of actions of one or more players associated with the electronic wagering game, a location of one or more players associated with the electronic wagering game, accomplishments attained in the electronic wagering game, play history in the electronic wagering game, or occurrence of wagering game conditions for the electronic wagering game.

5. The method of claim 1 further comprising:

setting a value of one or more prizes for the secondary contest, wherein the electronic wagering game is configured to use first math rules to compute first payouts for the electronic wagering game before the initiating the secondary contest;

computing, based on the value of the one or more prizes, second math rules different from the first math rules; and after the initiating the secondary contest, causing use of the second math rules to compute second payouts made via the electronic wagering game.

6. The method of claim 5, wherein the computing the second math rules comprises:

allocating a first portion of a theoretical expected payout percentage for the electronic wagering game to the value of the one or more prizes; and allocating a second portion of the theoretical expected payout percentage to one or more additional values associated with one or more additional prizes for the electronic wagering game.

7. The method of claim 1, wherein the at least one winning outcome in the electronic wagering game that used the temporary combined symbol set has at least one symbol from the first symbol set and at least one symbol from the at least the one or more portions of the second symbol set.

8. The method of claim 1, wherein at least a portion of the award comes from one or more of a source separate from the one or more wagers on the electronic wagering game or a promotional award account available for prizes only for a duration of the secondary contest.

9. The method of claim 1 further comprising detecting an event that occurs external to the wagering game machine, and wherein the initiating the secondary contest is in response to the event.

10. One or more non-transitory, machine-readable storage devices having instructions stored thereon, which when executed by a set of one or more processors of a gaming system cause the set of one or more processors to perform operations comprising:

incorporating into a first symbol set of a wagering game a second symbol set associated with a secondary contest independent from the wagering game, wherein the incorporating forms a temporary combined symbol set for concurrent use for a possible outcome of the wagering game and a possible outcome for the secondary contest, determining a value of one or more prizes for the secondary contest, wherein the secondary contest is configured to make the one or more prizes available via the wagering game for a limited duration of the secondary contest, wherein the wagering game is configured to use first math rules to compute first payouts for the wagering game prior to initiation of the secondary contest, wherein the wagering game is presented by a wagering game machine that includes a value input device configured to receive physical money to increase a credit balance of the wagering game machine proportional to a monetary value of the physical money, and wherein the credit balance is usable for placement of one or more wagers on the wagering game;

determining, based on the value of the one or more prizes, second math rules different from the first math rules, wherein the operation of determining, based on the value of the one or more prizes, the second math rules comprises allocating a first portion of a theoretical expected payout percentage for the wagering game to the value of the one or more prizes, or allocating a second portion of the theoretical expected payout percentage to one or more additional values associated with one or more additional prizes for the wagering game; and causing use of the second math rules to compute second payouts for the wagering game after initiation of the secondary contest.

11. The one or more non-transitory, machine-readable storage devices of claim 10, wherein a full amount of the theoretical expected payout percentage is specified in the first math rules to compute the first payouts for the wagering game prior to the initiation of the secondary contest, and wherein the operations further comprise including the first portion of the theoretical expected payout percentage and the second portion of the theoretical expected payout percentage in the second math rules.

12. The one or more non-transitory, machine-readable storage devices of claim 10, wherein a value of the first portion of the theoretical expected payout percentage is proportional to the value of the one or more prizes.

13. The one or more non-transitory, machine-readable storage devices of claim 10, said operations further comprising:

providing, for inclusion in the wagering game, the temporary combined symbol set, wherein the temporary combined symbol set is configured to indicate that the one or more prizes are awarded for the secondary contest;

detecting a trigger for presentation of one or more symbols from the temporary combined symbol set in the wagering game; and computing, based on the second math rules, a payout of the one or more prizes via the wagering game.

14. A system comprising:

at least one processor; and at least one memory device configured to store instructions which, when executed by the at least one processor, cause the system to perform operations to, provide a wagering game for presentation via a wagering game machine, wherein the wagering game includes a first symbol set used to indicate one or more wagering game outcomes before initiation of a secondary contest separate from the wagering game, wherein the wagering game machine includes a value input device configured to receive physical money to increase a credit balance of the wagering game machine proportional to a monetary value of the physical money, and wherein the credit balance is usable for placement of one or more wagers on the wagering game, initiate the secondary contest in response to a condition that occurs other than from the wagering game, incorporate a second symbol set into the first symbol set for use during the secondary contest and form a temporary combined symbol set for use in the wagering game, wherein the second symbol set is configured to indicate a promotional award for the secondary contest, modify one or more values for the second symbol set based on one or more of actions of one or more players associated with the wagering game, a location of one or more players associated with the wagering game, accomplishments attained in the wagering game, play history in the wagering game, or occurrence of wagering game conditions for the wagering game, cause use of the second symbol set in the wagering game, provide an award in response to at least one winning outcome in the wagering game that used the temporary combined symbol set, end the secondary contest, and cause the use of the second symbol set in the wagering game to terminate after the secondary contest ends.

15. The system of claim 14, wherein the operations are further to:

determine that a trigger occurs for presentation in the wagering game of one or more symbols from the temporary combined symbol set; and award one or more prizes for the secondary contest based on occurrence of the trigger.

16. The system of claim 14, wherein the operations are further to modify the one or more values for the second symbol set for sequential periods of a duration of the secondary contest.

17. The system of claim 14, wherein the operations are further to:

determine a value of one or more prizes for the secondary contest, wherein the wagering game is configured to use first math rules to compute first payouts for the wagering game prior to initiation of the secondary contest;

compute, based on the value of the one or more prizes, second math rules different from the first math rules; and after the initiation of the secondary contest, provide the second math rules to use, instead of the first math rules, to compute second payouts made via the wagering game during the secondary contest.

18. The system of claim 17, wherein the operation to compute the second math rules includes operations to:

allocate a first portion of a theoretical expected payout percentage for the wagering game to the value of the one or more prizes; and allocate a second portion of the theoretical expected payout percentage to one or more additional values associated with one or more additional prizes for the wagering game.

19. An apparatus comprising:

at least one value input device configured to receive physical money to increase a credit balance of a wagering game proportional to a monetary value of the physical money, wherein the credit balance is usable for placement of one or more wagers in the wagering game;

at least one display device configured to present the wagering game, wherein the wagering game includes a symbol set used as indicia of game outcomes for the wagering game;

at least one processor; and at least one memory device configured to store instructions which, when executed by the at least one processor, cause the apparatus to perform operations to, detect that a secondary contest begins, modify one or more values associated with a portion of the symbol set in response to detection that the secondary contest begins, wherein, after being modified, the one or more values associated with the portion of the symbol set are used to indicate a promotional award of one or more prizes for the secondary contest, detect a change to a value of the one or more prizes for the secondary contest during the secondary contest, wherein the wagering game is configured to use first math rules to compute first payouts for the wagering game prior to the change to the value of the one or more prizes, compute, based on the change to the value of the one or more prizes, second math rules different from the first math rules, use the second math rules, instead of the first math rules, to compute second payouts made via the wagering game during the secondary contest after the change to the value of the one or more prizes, detect that the secondary contest ends, and after the secondary contest ends, restore the one or more values associated with the portion of the symbol set to default values for the wagering game.

20. The apparatus of claim 19, wherein the at least one memory device is configured to store instructions which, when executed by the at least one processor, cause the apparatus to further perform operations to, modify the one or more values associated with the portion of the symbol set for sequential periods of the secondary contest.

21. The apparatus of claim 19, wherein the at least one memory device is configured to store instructions which, when executed by the at least one processor, cause the apparatus to perform operations to determine that a full amount of a value of the one or more prizes is not awarded during the secondary contest;

calculate a differential between the full amount and an amount paid out from the value of the one or more prizes, wherein the amount paid out is less than the full amount; and pay out the differential after the secondary contest ends.

22. The apparatus of claim 19, wherein the at least one memory device is configured to store instructions which, when executed by the at least one processor, cause the apparatus to perform operations to use the portion of the symbol set for a winning combination of symbols in the wagering game, wherein the winning combination of symbols is used as a first winning outcome according to the default values for the wagering game, and wherein at least a portion of the winning combination of symbols that uses the portion of the symbol set is used as a second winning outcome in the secondary contest according to the modified one or more values.

23. The apparatus of claim 22, wherein a degree of value of an award for the second winning outcome depends on a number of a same symbol from the portion of the symbol set appearing in the winning combination of symbols.

24. An apparatus comprising:

means for incorporating into a first symbol set of a wagering game a second symbol set associated with a secondary contest independent from the wagering game, wherein the secondary contest is presented via a wagering game machine, and wherein the incorporating forms a temporary combined symbol set for concurrent use for a possible outcome of the wagering game and a possible outcome for the secondary contest;

means for determining a value of one or more prizes for the secondary contest, wherein the secondary contest is configured to provide one or more prizes, and wherein the wagering game is configured to use first math rules to compute first payouts for the wagering game prior to initiation of the secondary contest, wherein the wagering game machine includes a value input device configured to receive physical money to increase a credit balance of the wagering game machine proportional to a monetary value of the physical money, and wherein the credit balance is usable for placement of one or more wagers on the wagering game;

means for determining, based on the value of the one or more prizes, second math rules different from the first math rules;

means for causing use of the second math rules to compute second payouts for the wagering game after the initiation of the secondary contest;

means for allocating a first portion of a theoretical expected payout percentage for the wagering game to the value of the one or more prizes; and means for allocating a second portion of the theoretical expected payout percentage to one or more additional values associated with one or more additional prizes for the wagering game.

25. The apparatus of claim 24, wherein a value of the first portion of the theoretical expected payout percentage is proportional to the value of the one or more prizes, wherein a full amount of the theoretical expected payout percentage is specified in the first math rules to compute the first payouts for the wagering game prior to the initiation of the secondary contest, and wherein the operations further comprise including the first portion of the theoretical expected payout percentage and the second portion of the theoretical expected payout percentage in the second math rules.

26. A method of operating a gaming system, said method comprising:

electronically connecting, via a network interface device of the gaming system, with a wagering game machine configured to present an electronic wagering game via one or more electronic output devices of the wagering game machine, wherein the electronic wagering game includes a first symbol set used to indicate one or more wagering game outcomes before initiation of a secondary contest, wherein the wagering game machine includes a value input device configured to receive physical money to increase a credit balance of the wagering game machine proportional to a monetary value of the physical money, wherein the credit balance is usable for placement of one or more wagers on the electronic wagering game;

initiating, by at least one of one or more electronic processing devices of the gaming system, the secondary contest in response to a condition that occurs other than from the electronic wagering game;

selecting, by at least one of the one or more electronic processing devices, a second symbol set for use during the secondary contest;

incorporating, via at least one of the one or more electronic processing devices, at least one or more portions of the second symbol set into the first symbol set of the electronic wagering game forming a temporary combined symbol set for the electronic wagering game, wherein the incorporating the one or more portions of the second symbol set into the first symbol set of the electronic wagering game comprises incorporating different portions of the second symbol set for different portions of the secondary contest;

providing an award in response to at least one winning outcome in the electronic wagering game that used the temporary combined symbol set;

setting a value of one or more prizes for the secondary contest, wherein the electronic wagering game is configured to use first math rules to compute first payouts for the electronic wagering game before initiating the secondary contest;

computing, based on the value of the one or more prizes, second math rules different from the first math rules;

after the initiating the secondary contest, causing use of the second math rules to compute second payouts made via the electronic wagering game;

allocating a first portion of a theoretical expected payout percentage for the electronic wagering game to the value of the one or more prizes;

allocating a second portion of the theoretical expected payout percentage to one or more additional values associated with one or more additional prizes for the electronic wagering game;

ending the secondary contest; and removing the at least the one or more portions of the second symbol set from the first symbol set of the electronic wagering game after the secondary contest ends.

27. An apparatus comprising:

at least one value input device configured to receive physical money to increase a credit balance of a wagering game proportional to a monetary value of the physical money, wherein the credit balance is usable for placement of one or more wagers in the wagering game;

at least one display device configured to present the wagering game, wherein the wagering game includes a symbol set used as indicia of game outcomes for the wagering game;

at least one processor; and at least one memory device configured to store instructions which, when executed by the at least one processor, cause the apparatus to perform operations to, detect that a secondary contest begins, modify one or more values associated with a portion of the symbol set in response to detection that the secondary contest begins, wherein, after being modified, the one or more values associated with the portion of the symbol set are used to indicate a promotional award of one or more prizes for the secondary contest, detect that the secondary contest ends, determine that a full amount of a value of the one or more prizes is not awarded during the secondary contest, calculate a differential between the full amount and an amount paid out from the value of the one or more prizes, wherein the amount paid out is less than the full amount, pay out the differential after the secondary contest ends, and after the secondary contest ends, restore the one or more values associated with the portion of the symbol set to default values for the wagering game.

28. An apparatus comprising:

at least one value input device configured to receive physical money to increase a credit balance of a wagering game proportional to a monetary value of the physical money, wherein the credit balance is usable for placement of one or more wagers in the wagering game;

at least one display device configured to present the wagering game, wherein the wagering game includes a symbol set used as indicia of game outcomes for the wagering game;

at least one processor; and at least one memory device configured to store instructions which, when executed by the at least one processor, cause the apparatus to perform operations to, detect that a secondary contest begins, modify one or more values associated with a portion of the symbol set in response to detection that the secondary contest begins, wherein, after being modified, the one or more values associated with the portion of the symbol set are used to indicate a promotional award of one or more prizes for the secondary contest, use the portion of the symbol set for a winning combination of symbols in the wagering game, wherein the winning combination of symbols is used as a first winning outcome according to default values for the wagering game, and wherein at least a portion of the winning combination of symbols that uses the portion of the symbol set is used as a second winning outcome in the secondary contest according to the modified one or more values, detect that the secondary contest ends, and after the secondary contest ends, restore the one or more values associated with the portion of the symbol set to the default values for the wagering game.

* * * * *